(12) United States Patent
Eckhardt et al.

(10) Patent No.: US 11,757,304 B2
(45) Date of Patent: Sep. 12, 2023

(54) VERSATILE SITE ENERGY ROUTER

(71) Applicant: GRIDBRIDGE, INC., Raleigh, NC (US)

(72) Inventors: Chad Eckhardt, Raleigh, NC (US); Stephen Timothy Watts, Fuquay-Varina, NC (US); Joseph E. Anstett, III, Raleigh, NC (US); Mark L. Ventura, Morrisville, NC (US)

(73) Assignee: Gridbridge, Inc., Raleigh, NC (US)

( * ) Notice: Subject to any disclaimer, the term of this patent is extended or adjusted under 35 U.S.C. 154(b) by 781 days.

(21) Appl. No.: 15/321,889

(22) PCT Filed: Aug. 3, 2015

(86) PCT No.: PCT/US2015/043396
§ 371 (c)(1),
(2) Date: Dec. 23, 2016

(87) PCT Pub. No.: WO2015/200931
PCT Pub. Date: Dec. 30, 2015

(65) Prior Publication Data
US 2017/0133879 A1 May 11, 2017

Related U.S. Application Data

(60) Provisional application No. 62/032,186, filed on Aug. 1, 2014, provisional application No. 62/015,703, filed on Jun. 23, 2014.

(51) Int. Cl.
*H02J 13/00* (2006.01)
*H02J 3/01* (2006.01)
(Continued)

(52) U.S. Cl.
CPC .......... *H02J 13/0096* (2013.01); *G05B 15/02* (2013.01); *G06Q 50/06* (2013.01);
(Continued)

(58) Field of Classification Search
CPC ........ H02J 13/0096; H02J 3/386; H02J 3/383; H02J 2003/143; H02J 3/382; H02J 3/14;
(Continued)

(56) References Cited

U.S. PATENT DOCUMENTS

2010/0127566 A1* 5/2010 Biester ................ E21B 33/0355
307/18
2012/0271470 A1* 10/2012 Flynn ...................... H02J 3/383
700/292

(Continued)

FOREIGN PATENT DOCUMENTS

WO    WO-9618937 A1 *  6/1996 ............... G05F 1/70

*Primary Examiner* — Thomas C Lee
*Assistant Examiner* — Anzuman Sharmin
(74) *Attorney, Agent, or Firm* — Andrew R. Shores; Williams Mullen

(57) ABSTRACT

An electrical distribution site energy management and router device, or SER device, may be installed between a customer premises and a distribution grid, and one or more alternative energy sources and energy storage devices may be electrically connected to the SER device. The SER device may intelligently route power from alternative energy sources to the customer premises, energy storage devices, even to the grid, through various modes of operation. The SER device may efficiently and economically route power during peak electricity price periods and outside of peak periods.

20 Claims, 14 Drawing Sheets

(51) Int. Cl.
| | |
|---|---|
| *H02J 3/18* | (2006.01) |
| *H02M 1/42* | (2007.01) |
| *H02J 3/38* | (2006.01) |
| *G05B 15/02* | (2006.01) |
| *G06Q 50/06* | (2012.01) |
| *H02J 3/14* | (2006.01) |

(52) U.S. Cl.
CPC ................................. *H02J 3/01* (2013.01); *H02J 3/14* (2013.01); *H02J 3/18* (2013.01); *H02J 3/381* (2013.01); *H02J 3/383* (2013.01); *H02J 3/386* (2013.01); *H02J 13/0006* (2013.01); *H02J 13/0079* (2013.01); *H02M 1/42* (2013.01); *H02J 3/382* (2013.01); *H02J 2310/14* (2020.01); *H02J 2310/64* (2020.01); *Y02B 70/3225* (2013.01); *Y02B 70/3266* (2013.01); *Y02E 40/72* (2013.01); *Y04S 10/123* (2013.01); *Y04S 20/222* (2013.01); *Y04S 20/224* (2013.01); *Y04S 20/242* (2013.01)

(58) Field of Classification Search
CPC .. H02J 3/381; H02J 13/0079; H02J 2003/146; G05B 15/02; G06Q 50/06; Y04S 10/123; Y04S 20/222; Y04S 20/224; Y04S 20/242; Y02B 70/3266; Y02B 70/3225; Y02E 40/72

See application file for complete search history.

(56) References Cited

U.S. PATENT DOCUMENTS

| | | | |
|---|---|---|---|
| 2013/0041516 A1* | 2/2013 | Rockenfeller | H02J 3/38 700/287 |
| 2013/0073104 A1* | 3/2013 | Sciacchitano | H02J 3/28 700/295 |
| 2013/0274947 A1* | 10/2013 | Miller | G06F 1/263 700/297 |
| 2013/0311000 A1* | 11/2013 | Kudo | H02J 3/46 700/296 |

* cited by examiner

VERSATILE SITE ENERGY ROUTER

RELATED APPLICATIONS

This application claims priority to International Application PCT/US2015/043396, filed Aug. 3, 2015, which claims priority to U.S. Provisional Application No. 62/032,186 filed on Aug. 1, 2014, and claims priority to International Application PCT/US15/22979, filed Mar. 27, 2015, which claims priority to U.S. Provisional Application No. 62/015,703, filed Jun. 23, 2014, each of which are hereby incorporated by reference in their entirety.

STATEMENT REGARDING GOVERNMENT SUPPORT

None

FIELD

This application relates to devices, systems, and methods for routing electrical energy management and routing.

BACKGROUND

Advanced power delivery is essential to meeting the growing demand for power distribution. Power consumers expect safe and reliable electricity, and the generation and consumption of power is increasingly monitored, analyzed, scrutinized, and reported. Further, the environmental effects of the worldwide increase in energy demand are alarming, raising the need for enhanced efficiency in not only power generation, but also power distribution and use. Power delivery systems need to evolve. Consumers of electricity desire options and flexibility. Today's electrical grid that provides power to users, for example, was designed for a less-demanding consumer, in a less-demanding time, and for a significantly less-demanding purpose.

Consumers' steady adoption of new energy-related technology has the potential to reduce the price of adopting and exposing weaknesses in the fragile electrical distribution grid. The power distribution grid, which may also be referred to as the grid, was designed over a century ago. The grid was designed without anticipating the need to accommodate solar panels, wind turbines, electric vehicles, energy storage, and many other devices. Simultaneously, consumer intolerance for extended outages has grown, efficiency mandates are numerous, and traditional generation practices are being scrutinized. A need for options to complement the grid exists.

The power distribution substation is, in most distribution grids, the last point of "energy traffic control" before electricity is sent downstream to thousands of consumers. The growing emphasis on generation emissions and pressures to reduce carbon footprints necessitate system-wide efficiency gains, and exposed the limitations of the distribution grid and substation design. Because utilities (i.e., power providers) are able to control distribution only up to a power substation, utilities are limited on the level of services offered to consumers and the control of distributed generation and storage. Furthermore, centralized software platforms at the utilities promised some degree of improved efficiency and load management, but required a complicated complementary environment and supporting infrastructure not heretofore seen. Modernizing the distribution grid in this fashion will create the growing need for an immense communications bandwidth, extensive centralized processing power, numerous functioning downstream sensors, and intelligent hardware able to enact organized adjustments on a granular scale.

The power grid has a limited ability to integrate renewable power generation, as can be seen by the number of consumers seeking to integrate sources such as photovoltaic (PV) systems, and the correlated mandates to connect such devices to the grid. The distribution grid was originally designed for large centralized generation facilities and power flow in one direction—to the consumer. Unfortunately, centralized generation can neither sync with hundreds of power sources nor accommodate their variability. Although utilities have experimented with various energy storage solutions, there is still a need for an intelligent orchestration of power flow between the generation, storage, and load. The result has been resistance from utilities through the use of complex regulation, lengthily integration studies, and changes to the rates in order to integrate such technology.

What is needed is a new generation of versatile equipment with advanced capabilities to empower electricity users—consumers—to quickly adopt, utilize, and maximize the benefit of distributed local resources, therefore offering notable flexibility and localized capabilities.

SUMMARY

Described herein are electrical distribution site edge energy manager and router devices, generally referred to as "SER devices," and systems and methods to utilize embodiments of SER devices in the power distribution grid for efficient power distribution, routing, and management. Embodiments of the SER device support ongoing power system evolution, such as by empowering utilities and consumers to achieve multiple objectives simultaneously with the power delivery system. Embodiments of the SER device may integrate renewable generation, significantly increase distribution efficiency, optimize distribution electricity flow, and support a paradigm shift in using alternative sources as the primary energy supply, through one or more of the features and methods described herein.

In this disclosure, the term consumer generally and broadly refers to the recipient and/or user of electrical power from a power distribution grid, such as, for example, a home owner, a building owner or operator, an institution or facility, and typically (but not always) will be customers of a utility company.

Numerous embodiments of a SER device are possible. The following description is in no way intended to be limiting with respect to the scope of the disclosure. Embodiments of the SER device may include a smart AC combiner with (i) an electrical connection terminal in electrical communication with an electrical grid power supply, (ii) an electrical connection terminal in electrical communication with a consumer electrical supply line, and (iii) an electrical connection terminal in electrical communication with a central DC power stage. Embodiments may also include a central DC power stage having (i) at least one, if not more than one, bi-directional electrical connection terminal configured for electrical communication with a power storage device, the at least one bi-directional electrical connection terminal in electrical communication with the central DC power stage and capable of a first configuration for supplying DC power to the central DC power stage, and a second configuration for supplying DC power to the power storage device; (ii) at least one, if not more than one, alternative energy source electrical connection terminal configured for electrical communication with an alternative energy source, the at least one electrical connection terminal in electrical communication with the central DC power stage and configured to supply DC power to the central DC power stage. Embodiments of the SER device may also include a bi-directional DC/AC inverter in electrical communication with the central DC power stage and the smart AC combiner, the bi-directional DC/AC inverter capable of a first configuration for supplying AC power to the smart AC combiner, and a second configuration for supplying DC power to the central DC power stage.

Embodiments of the SER device may also have a controller layer configured to control at least the bi-directional DC/AC inverter, the control layer comprising at least one computer processor and nonvolatile memory coupled to the computer processor. In some embodiments, the controller layer may control other features and aspects of the device, such as pursuant to one or more algorithms. For example, an SER device may be configured to operate in an islanded and/or a net metering mode. A controller layer may be configured to operate the SER device in the particular mode. Some embodiments may include, or be configured to communicate with, a home energy management system.

Some embodiments may be configured for modularity. For example, an SER device may be configured to receive one or more connection terminals for alternative energy sources and/or energy storage devices. Some embodiments may include one or more plug-in card slots, each plug-in card slot in electrical communication with the central DC power stage, for receiving various software applications.

In some embodiments, the modular circuit layer may include a central DC power stage. Some embodiments may include modular power processing architecture that can be scaled to multiple power levels based on application requirements. The power processing circuit may be configured to convert power received at the central DC power stage to DC power, and to convert DC power exiting the central DC stage to AC power. A central DC power stage may advantageously allow for incorporating power supplied by AC power sources and DC power sources. A central DC power stage may also allow for providing power to AC power loads and DC power loads. A central DC power stage may also allow for AC phase synchronization.

Embodiments of the SER device may include a controller layer configured to control other features, functions, components, and/or layers of the SER device. For example, a controller layer may control the modular electrical circuit layer. The controller layer may include one or more computer processors and non-volatile memory, and may be configured to run one or more algorithms as described in more detail below. Algorithms may include, for example only, internal status algorithms, grid event management algorithms, power distribution algorithms, algorithms for managing reactive power, safety protocols, internal bypass algorithms, cooling and heat management algorithms, cold start protocols, micro-grid formation and management protocols. One of ordinary skill should recognize that numerous algorithms may be developed and used to enable the features and functions described below, with respect to both a single SER device and also a micro-grid formed from more than one SER device.

Embodiments of the SER device may include a physical layer comprising, for example, one or more communication devices, graphical user interfaces, and the like. The physical layer may be configured to provide one or more communications services, through one or more communication devices. A communication device may be in operable communication with the controller layer. In some embodiments, a communication device may communicate with one or more of an end user, such as a utility, a consumer, and other SER devices.

Embodiments of the SER device may include one or more bi-directional DC power connection ports. A DC power connection port may be configured for electrical communication with a DC power resource, and may be in electrical communication with a central DC power stage. For example, a DC power connection port may provide DC power to or from a central DC power stage.

Embodiments of the SER device may include one or more AC power connection ports. An AC power connection port may be configured for electrical communication with an AC power source, and may be in electrical communication with an AC-to-DC power converter. The AC-to-DC power converter, in turn, may be in electrical communication with the central DC stage. In some embodiments, the SER device may receive power from and/or supply power to AC power devices and DC power devices.

Embodiments of the SER device may contain one or more sensors for sensing various parameters. For example, sensors may monitor at least one of voltage, current, power quality, and device load. Sensor may be used to monitor the primary electrical connection, secondary electrical connections, and various stages, circuits, components, and layers within a SER device.

In some embodiments, a SER device may use one or more sensors in connection with distributing power, monitoring loads, and adjusting for power quality, for example. Embodiments of the SER device may include a virtual AMI meter, for measuring load on the SER device. In some embodiments, the SER device may measure load on one or more consumers receiving power from the SER device. Embodiments of the SER device may include one or more heat sinks.

Embodiments of the SER device may be configured for implementing one or more operating algorithms. For example, an SER device may be configured for operation in an islanded mode, such as when grid power is unavailable. As another example, an SER device may be configured for operation in a net metering mode. Some embodiments may be configured to route power based on variables such as the price of utility-supplied power and the customer premises demands.

These and other advantages will be apparent from the following description and the drawings appended hereto.

DETAILED DESCRIPTION

The following paragraphs describe various embodiments and features of an electrical distribution grid edge energy manager and router device, generally referred to as the site energy router ("SER") device. It should be understood that numerous embodiments of the SER device are described herein, and thus a SER device may incorporate any number of the features described below. Likewise, the embodiments of methods for managing and routing electrical distribution described below may use different embodiments of a SER device.

The customer premise may be any building drawing electrical power from an electrical grid, such as, for example, a single family dwelling, a multi-tenant unit, business and office buildings, manufacturing locations, and the like. This application is not intended to be limited as to the nature of the customer premises.

Electrical utilities deliver electrical power to customer premises, typically through a meter for monitoring and billing. The electricity is normally protected and distributed within the customer premises by a circuit breaker panel at or near the customer premise. Thus, the typical utility-customer demarcation line is the meter.

Figure 1:
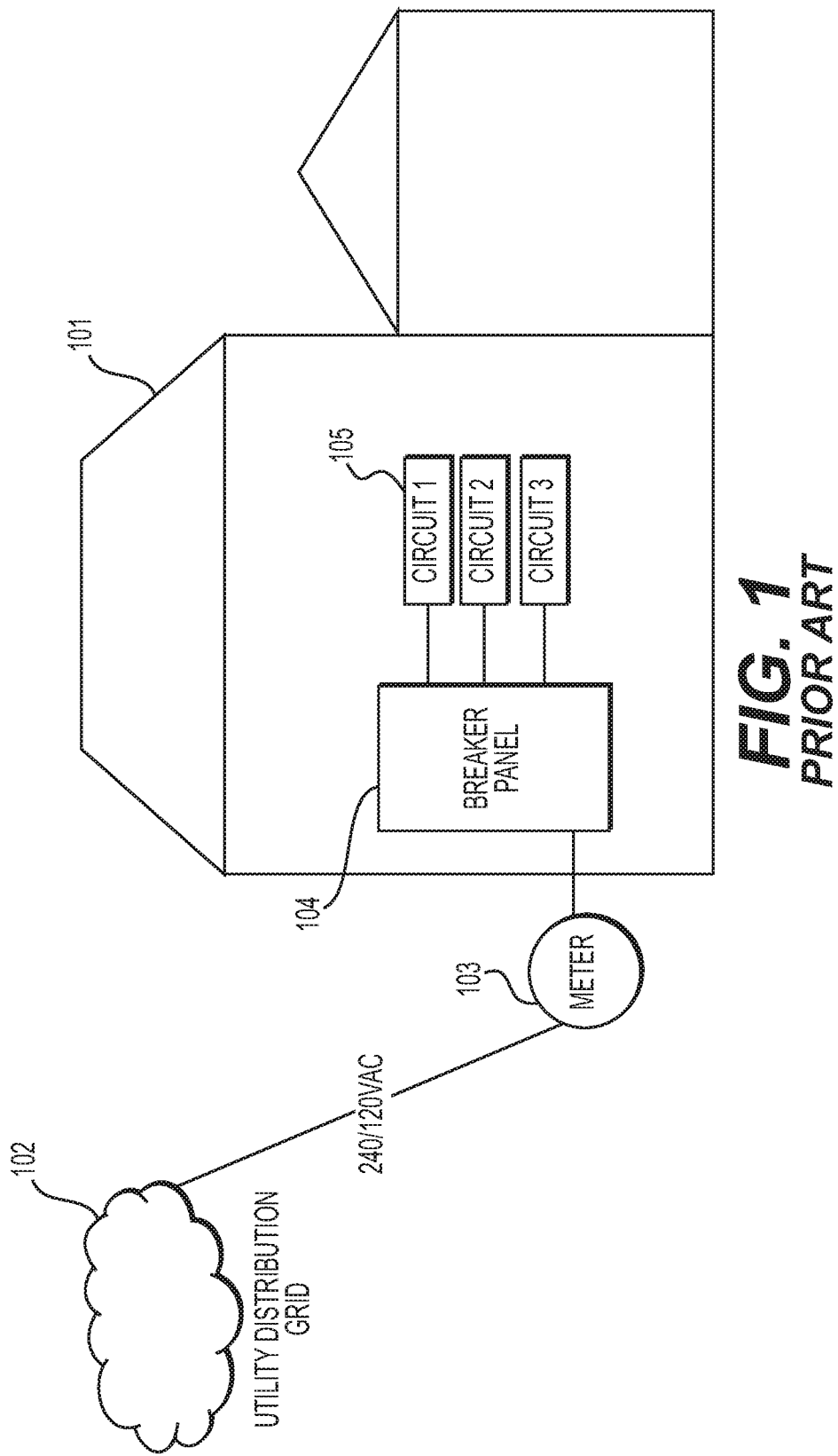
FIG. 1 illustrates a typical electric utility customer circuit.

FIG. 1 illustrates a typical electric utility customer circuit. As shown in FIG. 1, contemporary electric utility customer circuits connect a customer premise 101 to a utility distribution grid 102 through a breaker panel 104 attached to or located near customer premise 101. Breaker panel 104 is typically connected to an electric meter 103, and may be connected to a plurality of circuits 105 within and around customer premise 101.

During a grid power outage, grid-tied systems must be turned off (utility regulation) for the safety of the utility workers. If grid-tied systems were not turned off, dangerous energy levels could be present within the utility network during a grid power outage when utility workers are on-site working to resolve the outage. These energy levels could also (un-expectantly) propagate to other utility customers. In all cases nobody expects the presence of power during a utility power outage, compounding the danger. From the customer's perspective, the investment in an alternative energy system can be rendered useless during a utility power outage, when in reality the need for power from an alternative energy source is most critical. As described below, embodiments of the SER device overcome these disadvantages.

When a customer seeks to use alternative energy sources, such as photovoltaic cells, wind turbines, petroleum, natural gas, etc., as well as energy storage devices, the customer premises typically uses a grid-tied approach. In a grid-tied approach, power electronics (such as, for example, inverters, rectifiers, and converters) for one or more alternative energy sources and energy storage devices connect directly to the utility distribution grid 102. Although the location(s) may vary, such power electronics are usually located either within a utility-controlled area of the grid, or inside the customer premises, they are normally not electrically isolated from the distribution grid 102. Thus, regardless of where the power electronics are physically located, they may have a significant and detrimental effect on the utility feeder circuit that supplies electricity to the customer premises, and also negatively impact other local customers. For example, feeder circuit voltage regulation and stability, as well as power harmonics, can be negatively impacted.

Embodiments of the SER change the traditional approach for utilizing alternative energy sources and/or energy storage, and permits a paradigm shift from primary reliance on grid-supplied energy to primary reliance on alternative energy sources. Through the introduction of an SER embodiment, power at customer premises may be redirected or routed to one or more energy storage devices, as opposed to returning power to the distribution grid. Further, embodiments of the SER may provide alternatives to the traditional grid-tied connection, eliminate complex market-specific net metering stipulations, and establish a self-contained or "islanded" generation-storage-load solution at the customer premises. Embodiments of the SER may also support net metering modes of operation. Embodiments of the SER may also address grid safety by, for example, isolating locally generated sources from the distribution grid, such as, for example, during grid outages. Operating on the low-voltage side of the distribution transformer, where voltages range internationally between, for example, 100-600V. It should be appreciated that embodiments described herein relate to operating parameters common in the United States, yet embodiments may be configured for operation under different parameters as may be provided in other regions. Some embodiments may include a modular power processing architecture that may be scaled to multiple power levels based on particular application requirements. Some embodiments of the SER device may contain a physical layer providing one or more physical layer communications capabilities and/or graphical user interfaces, and may include various network security features necessary for the ever-evolving grid communications infrastructure. In some embodiments, the physical layer may be flexible and agnostic with respect to evolving distribution grid communications infrastructure, such that communications capabilities may be replaced, added, and/or updated as the communications infrastructure continues to evolve. Numerous additional benefits will be apparent from the following description of embodiments of the SER.

Some embodiments of the SER device may be configured to operate in cooperation with a customer premise's pre-existing Home Energy Management System (HEMS). Generally, a HEMS monitors energy cost and manages the various loads (appliances, HVAC, water heating, etc.), particularly to use less power during peak cost time. When a SER device is integrated with HEMS, load shedding (managing load power consumption) to maximize alternative energy source usage (thus minimizing grid usage) may be possible.

Some embodiments may be configured to perform certain various functions of a HEMS. For example, an onboard control layer may be configured to provide various HEMS functions. As an example, an embodiment may follow an algorithm using information obtained from the HEMS to control both voltage levels and, if enabled, various components of the total customer load (e.g., time based usage and/or load shedding) for the purpose of improved overall energy efficiency. The algorithm may use, for example, historical load data to control charging times and charging levels of energy storage devices, to maximize localized use of alternative energy sources providing energy to the customer premise.

Figure 2:
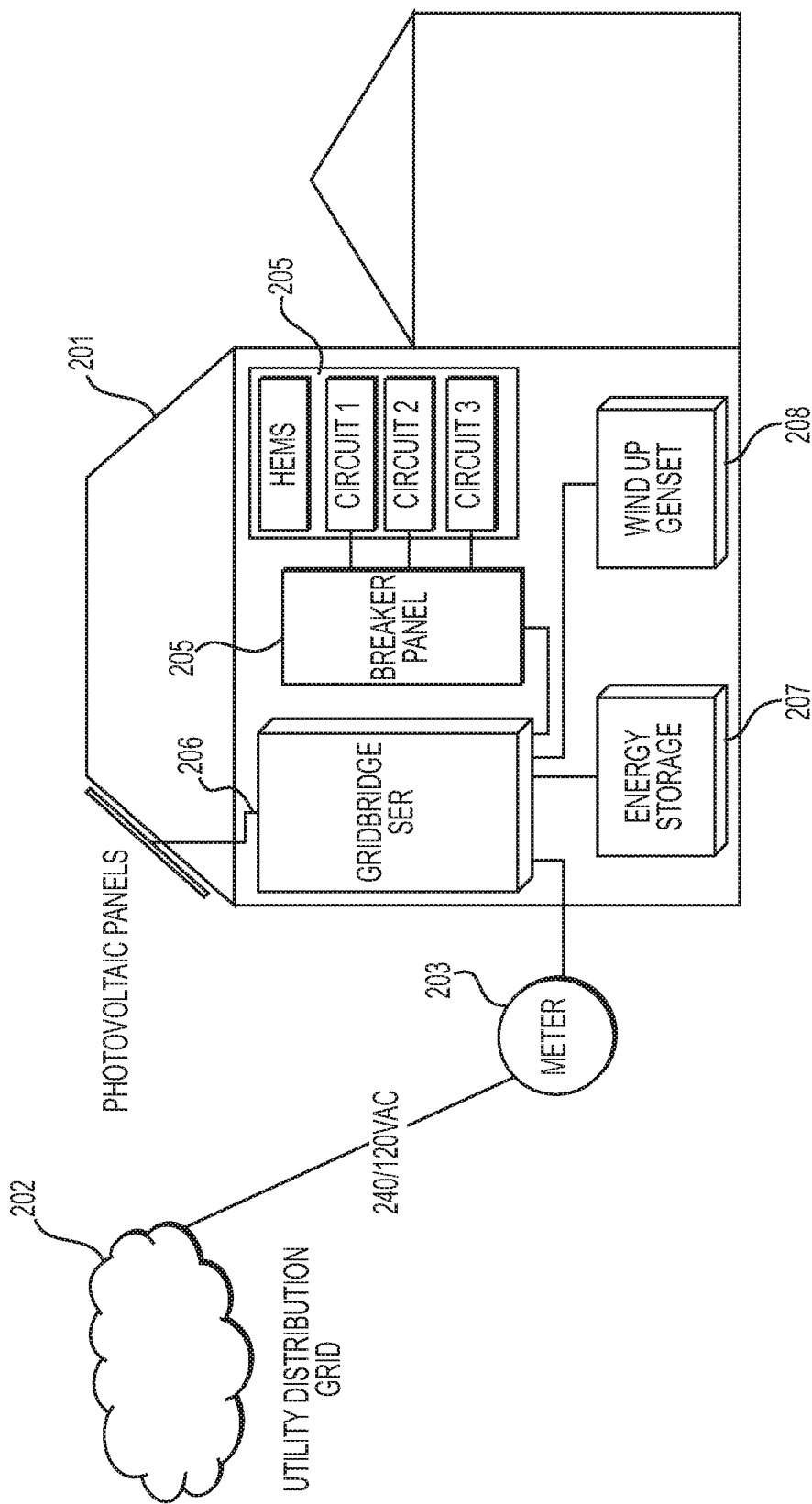
FIG. 2 shows an embodiment of the present approach installed on a customer premise.

FIG. 2 shows an example of customer premise 201 connected to a utility distribution grid 202. In this embodiment, SER device 206 connects customer premise 201 to the grid 202 through meter 203. Other embodiments may be configured to connect to the grid 202 in other configurations, such as, for example, before meter 203. SER device 206 may connect to one or more alternative energy sources, such as, for example, wind or fossil fuel generator 208, and photovoltaic cell 209. SER device may also connect to one or more energy storage devices 207. In some embodiments, SER device 206 may connect to the customer's breaker panel 204, which may include an energy management system 205 operating one or more circuits. Some embodiments may be configured to provide power to multiple customers, such as multi-tenant dwellings. In some embodiments, an SER device may include one or more onboard energy management systems, and may be configured to operate one or more circuits at the customer premise 201.

Figure 3:
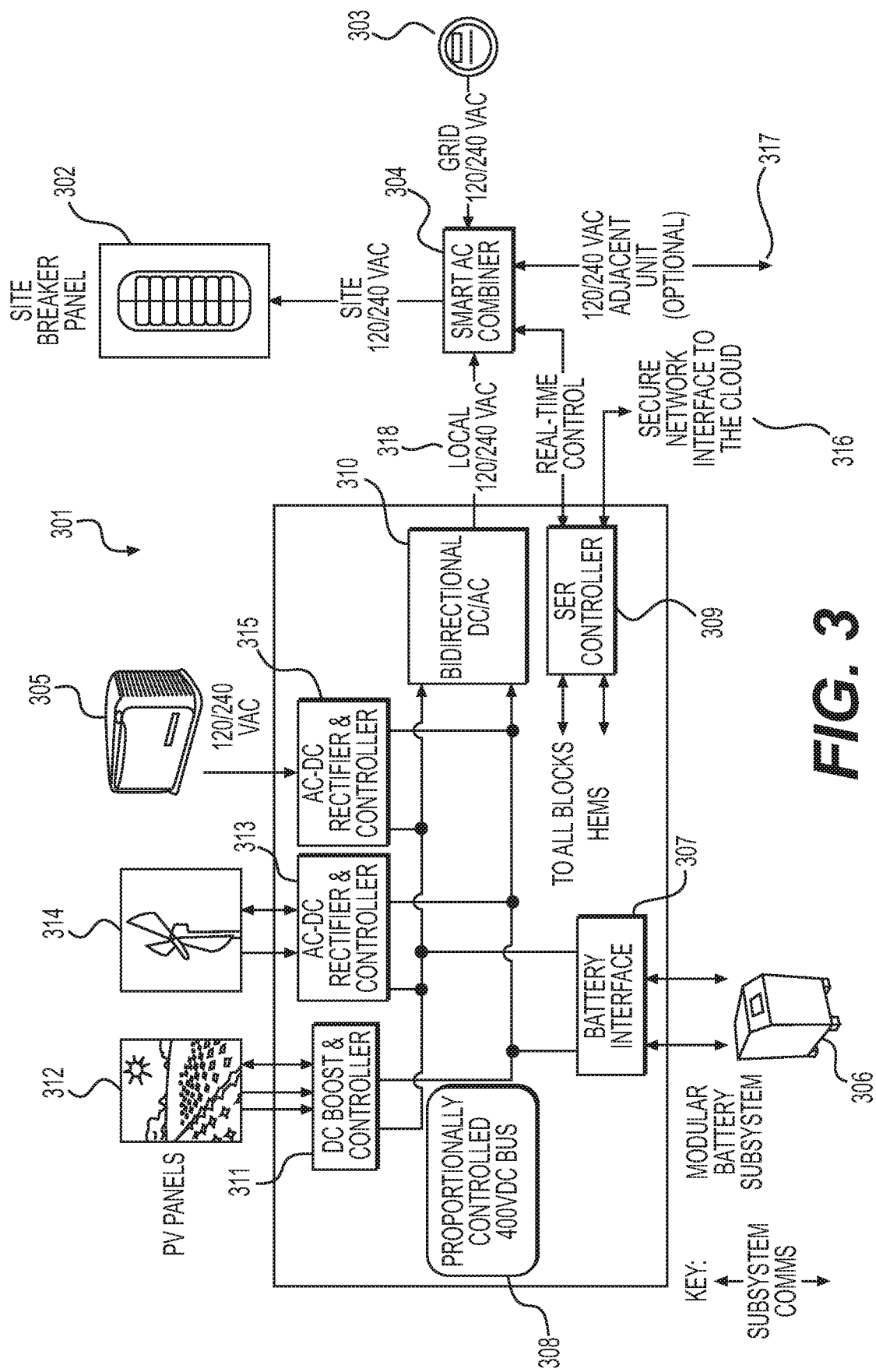
FIG. 3 is a block diagram of various components that may be included in embodiments of the present approach.

FIG. 3 shows a block diagram of various components that may be included in embodiments of the SER device 301. As shown in this embodiment, SER device 301 may connect to a customer premise's breaker panel 302 (or other connection point to a customer premise) and a utility provider's power meter 303. In this embodiment, SER device 301 connects to breaker panel 302 and power meter 303 through a smart AC combiner 304. Generally, a smart AC combiner couples grid supplied power and locally generated power to the customer premises under control of the SER controller. Of course, other control regimens are possible. Some embodiments of a smart AC combiner may support operation of an islanded mode, as described herein, typically under control of the SER Controller. Islanded mode operation is advantageous during a grid power outage for utility safety, and allows the end customer to use alternative energy sources when the grid is not available. Some embodiments of a smart AC combiner may implement net-metered operation, as described below, and may be under control of the SER controller. Additionally, some embodiments of a smart AC combiner may perform a functional "bypass" of the inverter (or disconnect the inverter) during system failure or upon command.

The SER device 301 may include a controller layer 309 having, for example, an onboard programmable controller. The controller layer 309 may be configured to control various operations, features, functions, components, and/or layers of the SER device. For example, a controller layer may control the electrical circuit layer including internal bus 308 and connections to various alternative energy sources and energy storage devices. The controller layer may include one or more computer processors and non-volatile memory, and may be configured to run one or more algorithms as described in more detail below. Algorithms may include, for example only, internal status algorithms, grid event management algorithms, power routing algorithms, safety protocols, cooling and heat management algorithms, cold start protocols, and management protocols. One of ordinary skill should recognize that numerous algorithms may be developed and used to enable the features and functions described below.

SER controller 309 may also control a customer's energy management system, including energy management systems external to the SER device 301 (such as shown in FIG. 2, for example). The control layer 309 may also communicate with the smart AC combiner 304 and other resources, such as a network interface to various communications infrastructures, including for example a cloud storage network 316. As described in more detail below, an SER device's control layer 309 may also control a smart AC combiner 304 in real-time. Such real-time control may be used to implement various algorithms, including, for example, islanded operation, peak-cost operation, and net metering mode. Some embodiments of the control layer 309 may include various security features, such as anti-hacking and cybersecurity features. Similar features may or may not be included in a physical layer as well.

Embodiments of the SER device 301 may be configured for electrical connection to one or more alternative energy sources, such as, for example, photovoltaic cells 312, wind generator 314, and fossil fuel generator 305. An SER device 301 may be configured to connect to multiple types of alternative energy sources. In some embodiments, an SER device 301 may include modular connection points that may be customized depending on the alternative energy sources available at a particular customer premise. In some embodiments, the SER device 301 may be configured for receiving expanded capacity to connect to additional alternative energy sources. Expanded capacity may be through, for example, modular connection points that may be connected to the physical SER device housing and the internal electronics and control layers. It should be appreciated that the control layer 309 may be configured to control operation of the alternative energy source(s), and the circuitry connecting thereto.

Depending on the type of alternative energy source, the SER device 301 may include various electrical components to provide electrical connection. For example, embodiments of the SER device 301 may include DC booster and related control circuitry for receiving power from and controlling photovoltaic cells 312. Likewise, embodiments of the SER device 301 may include AC-DC rectifier circuitry 313 and 315 and related control circuitry for receiving power from and controlling wind generators 314 and fossil fuel generators 315. It should be appreciated that the particular circuitry may vary, depending on the particular alternative energy sources.

Embodiments of the SER device 301 may be configured for electrical connection to one or more energy storage devices 306, such as, for example, one or more modular battery subsystems, batteries, or electrical vehicle chargers. The energy storage device may be connected through an interface 307, which may contain the circuitry appropriate to connect the particular energy storage device to the internal bus 308. Interface 307 may be bi-directional, in that power may be supplied to or from an energy storage device 306. The direction of the energy routing may be controlled by, for example, SER control layer 309. As described below, SER control layer 309 may route energy depending on one or more modes of operation, based on, for example, one or more algorithms. As with the alternative energy sources, embodiments of the SER device 301 may be configured for receiving expanded capacity to connect to additional energy storage devices. Expanded capacity may be through, for example, modular connection points that may be connected to the physical SER device housing and the internal electronics and control layers. It should be appreciated that the control layer 309 may be configured to control operation of the energy storage device(s), and the circuitry connecting thereto.

Some embodiments of the SER device may include a Battery Management System (BMS). A BMS monitors and, either separate from or in connection with the controller layer 309, controls the safe charge and discharge of individual energy storage device cells. The BMS may be configured for operation through interface 307 with the energy storage devices onboard (if any) and connected to a SER device.

Embodiments of the SER device 301 may include an internal DC bus 308. DC bus 308 may be proportionally controlled. In proportionally controlled embodiments, a power source can supply 0-100% of its sourcing capacity to the DC bus 308 for the sinks (e.g., inverter 310, energy storage devices) to use. Also, a sink can consume 0-100% of the available energy on the DC bus.

The use of an internal DC bus 308 may be used for synchronizing energy supplied by alternative energy sources AC sources which may (or may not) be out of sync. Combining AC power sources at a DC bus 308 effectively synchronizes the frequency and otherwise integrates out-of-AC phase sources. AC sources wind generator 314 and fossil fuel generator 305 can thus be at any phase relationship, prior to the DC bus 308. Embodiments employing such high-voltage DC power conversion architecture, e.g., in which energy sources and energy sinks are integrated and dynamically managed onto a DC bus, such as a proportionally controlled high-voltage DC bus 308, may require fewer—if any—DC/AC and/or AC/DC converter stages, because energy flow is effectively controlled through DC voltage levels and current flows in such embodiments.

Additionally, use of an internal DC bus 308 may eliminate the need for frequency synchronization and power quality improvement, at least due to the reduction of harmonics. Filtering introduced on the output side of some embodiments of the SER device also offers a high level of power quality to the customer and/or connected electric utility.

Some embodiments of the SER system may include connectivity for one or more external DC buses, in which DC sources and loads may attach. For example, attachment may be through an intelligent DC/DC converter. In some embodiments, the SER control layer 309 may control an external bus. Energy sources and energy sinks may connect to the DC bus and provide or consume power as part through one or more control algorithms, such as those described in more detail below. It should be appreciated that embodiments of the SER device may use algorithms other than as disclosed herein, for the control and operation of such devices.

Embodiments of the SER device may include one or more plug-in card slots that interface to the DC power stage 308. The DC bus 308 may also include a shared communications bus, through which cards may communicate with SER controller 309. Alternatively, plug-in card slots may communicate through other elements of a physical layer. Various cards may be inserted that service DC power features of the SER device, such as, for example, energy storage devices and alternative energy sources. As a result, embodiments of the SER device may be configured to meet specific needs, without requiring extensive modifications to the SER device. The shared DC power bus also allows various modifications after initial purchase, through plug-in devices, and possibly without the need for professional services.

In addition to plug-in cards, as new localized generation sources, loads, and other devices become available, embodiments of the SER device may use physical layer communications devices to download application modules to manage and control the new equipment. This functionality may also be used for SER device features. For example, software applications may be available through the cloud infrastructure over the network interface 316.

Embodiments may include a graphical user interface for controlling various aspects of the device and/or software applications available on a device. Demonstrative software applications include:

1. Weather forecasting connectivity for preparation charging and preservation of energy storage prior to potential outages. A relevant scenario would be, for example, when high winds are expected in geographical areas with overhead distribution lines. Another relevant scenario would be the automatic firing of an in-home generator days in advance of a forecasted storm to ensure proper operation.
2. Energy conservation, where the user would request capabilities to minimize consumption as a result of resource preservation or financial constraint.
3. Enhanced utility coordination application, where the SER is used to manage performance with regard to utility-prescribed peak usage charges, TOU charges, demand response agreements, planned outages, etc.
4. Customer energy usage statistics and analysis application, where areas for savings are suggested.
5. Equipment preservation application, where energy storage charging/discharging cycles are optimized to maximize equipment lifetime. Additionally, high quality power (uninterrupted, low harmonic content, no surges) is targeted in order to maximize the life of electronics and electrical equipment in the home.
6. Integrated HEMS application where directly connected loads are powered during periods of lower rate structure. Outage management application (load shedding), where source and load availability is surveyed, resulting in either a predefined or user-customizable prioritization scenario.

As shown in the embodiment in FIG. 3, energy received from an alternative energy source supplying AC power may be converted from AC power to DC power through one or more AC-DC rectifiers 313. The ability to connect potentially out-of-sync AC devices to a SER device allows for the advantageous management of AC energy sources. Also as shown in the embodiment in FIG. 3, power received from an alternative energy source supplying DC power may be stepped up in voltage through, for example, a DC boost converter 311. As a result, DC bus 308 may then combine multiple sources of energy.

In some embodiments of the SER device, DC power may be integrated and dynamically controlled by the SER control layer 309 and supplied to the customer premises as AC power. The conversion may be performed by internal power electronics representing a bi-directional inverter. The bidirectional inverter may be used to recharge the energy storage device(s) from the utility feed when desired, and/or economically optimal, such as through use of algorithms, including algorithms described below. In addition to eliminating the need for a 1:1 generation/load to inverter topology (which reduces the overall system cost), such topology also eliminates undesired frequency synchronization issues.

Embodiments of the SER device 301 may also include a bi-directional DC/AC inverter 310, which may provide DC power to or from DC bus 308, and may provide AC power to or from smart AC combiner 318. For example, bi-directional inverter 310 may be used to charge energy storage device(s) from the utility feed when desired and/or economically optimal. The direction of the energy routing may be controlled by, for example, SER control layer 309. As described below, SER control layer 309 may route energy depending on one or more modes of operation, based on, for example, one or more algorithms. As shown in the embodiment in FIG. 3, the internal DC bus 308 may be connected to a bi-directional DC/AC inverter 310, such that output power from the DC bus 308 may be converted into a single AC waveform at a desired output voltage 318, or alternatively supplied to the DC bus 308 at the desired DC voltage. In some embodiments, AC power consumed by the inverter 310 may present a near unity power factor to the servicing electric utility.

As described herein, embodiments of the SER device may implement one or more algorithms to manage and route power flow. For example, when a surplus of power is available within the customer premises, an algorithm may enable energy to flow in a bi-directional nature to local loads, and back to the grid AC source. When locally generated power, such as alternative energy sources, is insufficient for the loads, an algorithm may enable energy to flow bi-directionally from the inverter and the utility feed to the local loads. Such features may improve the overall energy efficiency of the customer premise.

Some embodiments of the SER may support one or more separate AC loads directly attached to the SER device, such as, for example, through standard consumer level plug and socket systems. In some embodiments, such loads may be switched on and off, or powered up or down to manage load requirements. The SER control layer 309 may implement one or more algorithms, based on, for example, energy priority and on trigger events, such as energy availability, present charge rate, and outage condition. An example scenario is electrical vehicle charging on a priority basis, during the lower cost overnight hours.

Embodiments of the SER device may support a three-phase power system through a modular modification. The modular nature of the SER device topology described above, the DC bus, makes this possible. In some embodiments, with the replacement of the single phase inverter with a three phase inverter, and likewise replacing the single phase AC Combiner with a three phase combiner, the system becomes a three-phase system.

Some embodiments may provide service to a single customer and/or an integrated micro-grid service in multi-tenant units (MTU) applications. The modular nature of the SER topology and the DC bus, as described above, supports the variability of embodiments of the SER device. For example, using a smart AC combiner with multiple breaker panel connections, a SER device can be configured to support multiple customer connections as required in MTU applications.

As can be seen from the embodiment in FIG. 3, energy from alternative energy sources may be converted to DC power and routed to the DC bus 308, such as through the SER controller layer 309. In one mode of operation, active alternative energy sources provide as much energy as possible to the DC bus 308. Alternatively, active sources may be controlled to proportionally source energy based on static profiles with heuristics and/or dynamic variables. Both the battery (charging) and the inverter may, in some embodiments, draw power from the DC bus 308. Under some embodiments and algorithms, when demand exceeds available power from the DC bus 308, the inverter 310 may receive priority over energy storage devices 306. Alternatively, when available power from the DC bus 308 exceeds demand from the inverter 310, then power may be proportionally shared between customer premises and energy storage devices 306.

Figure 4A:
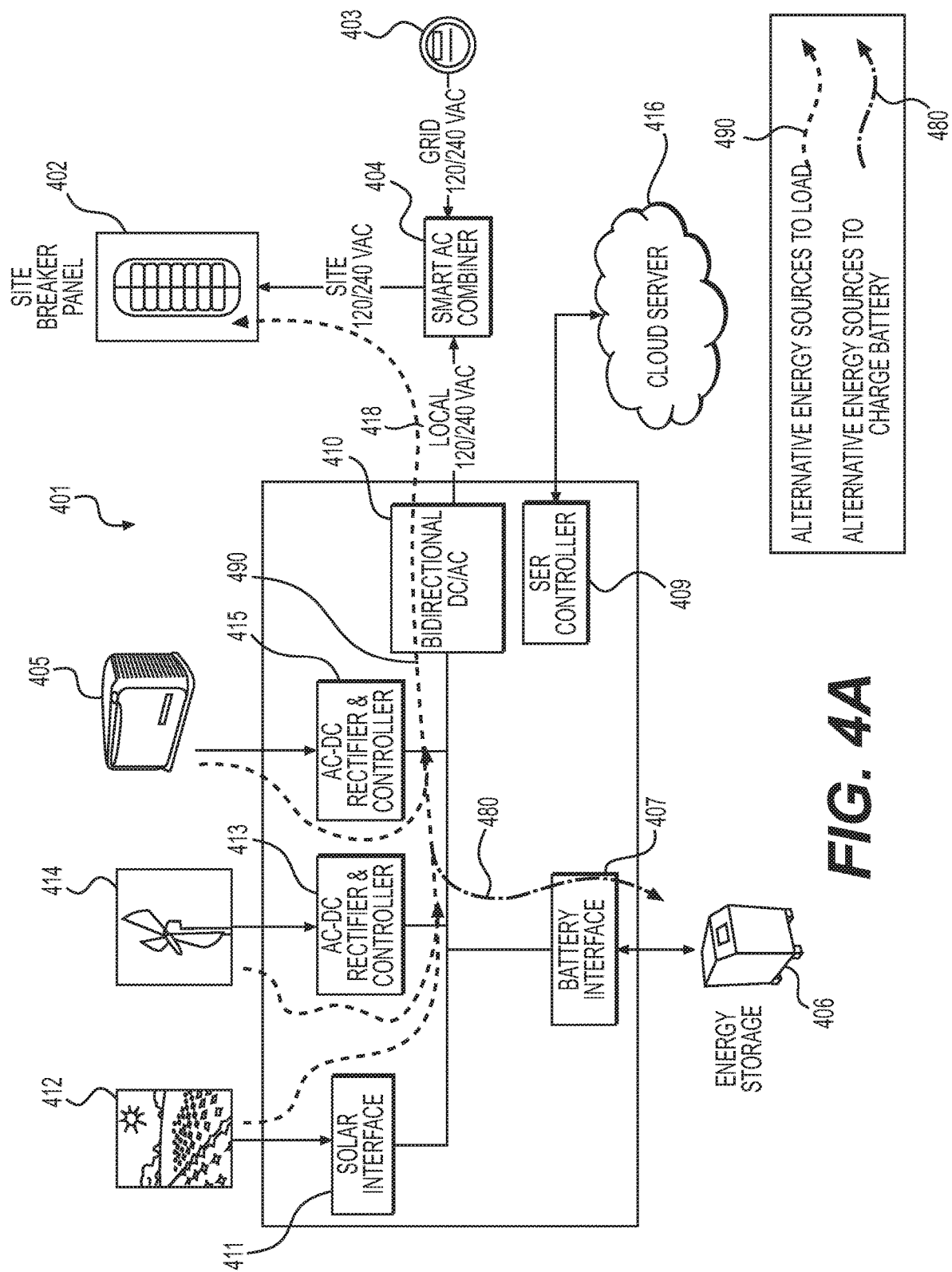
FIGS. 4(A) through 4(E) show example operating configurations for an embodiment of the present approach.

FIG. 4(A) shows an example energy routing configuration in which power from alternative energy sources 412, 414, and 405 may be routed to both the inverter 410 and an energy storage device 406. Power 490 supplied to inverter 410 may be proportionally controlled to power 480 supplied to energy storage device 406.

Figure 4B:
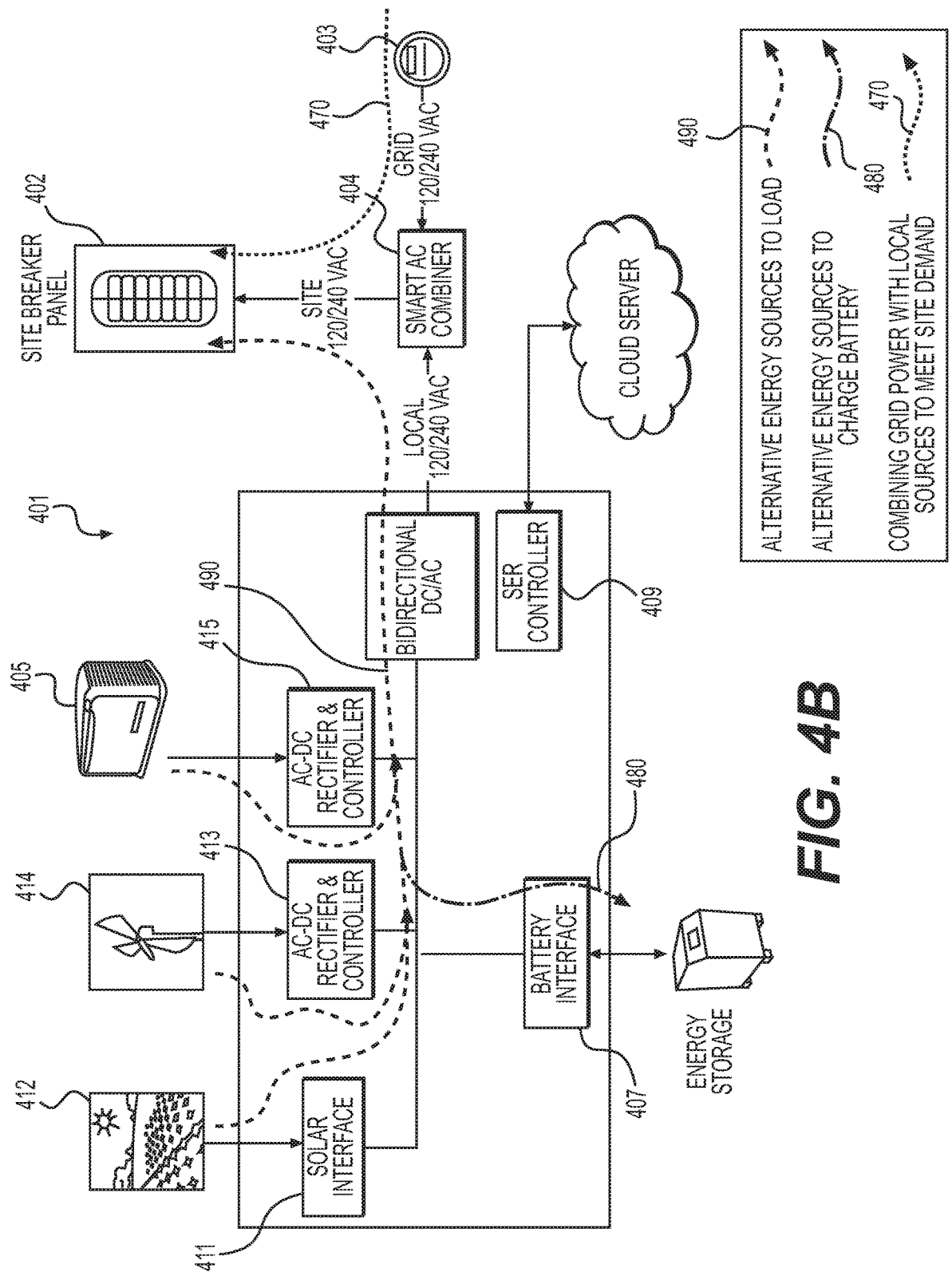

Some embodiments may be configured to operate in a grid-tied mode, as shown in FIG. 4(B). For example, the smart AC combiner 404 can accommodate the case where more power is required by the customer premise than available from available alternative energy sources, and supplied through the inverter 410. In this case, power 470 supplied by the grid 403 may be combined with power 490 supplied by the inverter 410, to satisfy the customer premise demand. Depending on the algorithm, power 480 may or may not be shared with any energy storage devices 406, and may be provided by energy storage devices 406. In some embodiments and algorithms, grid power 470 may be considered a secondary power source, used when the inverter 410 cannot provide sufficient power to satisfy the customer premise demand.

Figure 4C:
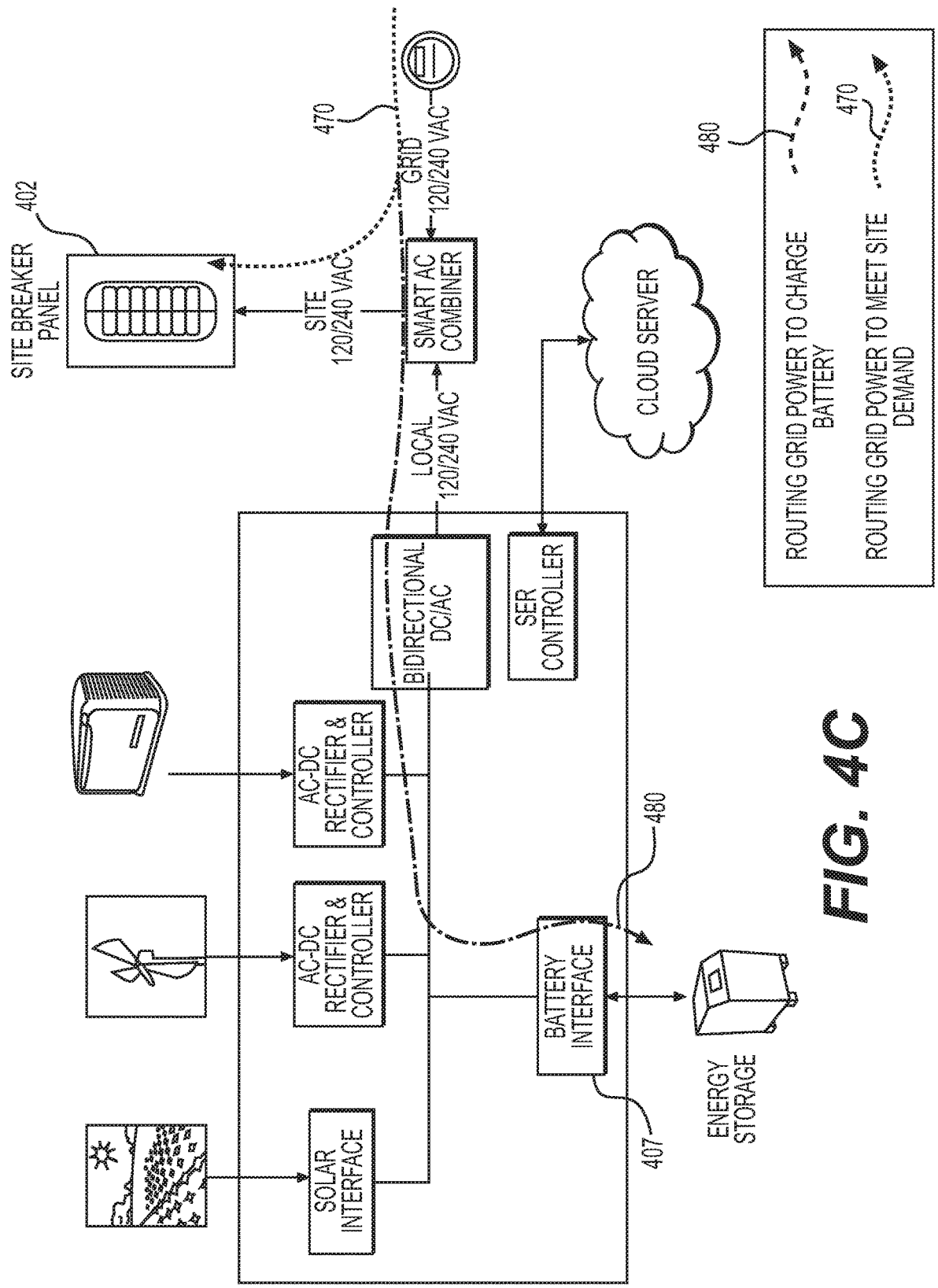

As shown in FIG. 4(C), some embodiments and algorithms may enable a grid-tied SER device 401 to provide power 480 to an energy storage device 406 during periods when alternative energy sources 412, 413, and 405 are not active, such as overnight. For example, the inverter 410 direction may be reversed, such as by SER control layer 409, such that some power from grid 403 is routed to the DC bus 408 to the energy storage device 406. Additionally, the smart AC combiner 404 may continue to supply grid power 470 to the customer premise, while also routing power to the inverter 410.

Figure 4D:
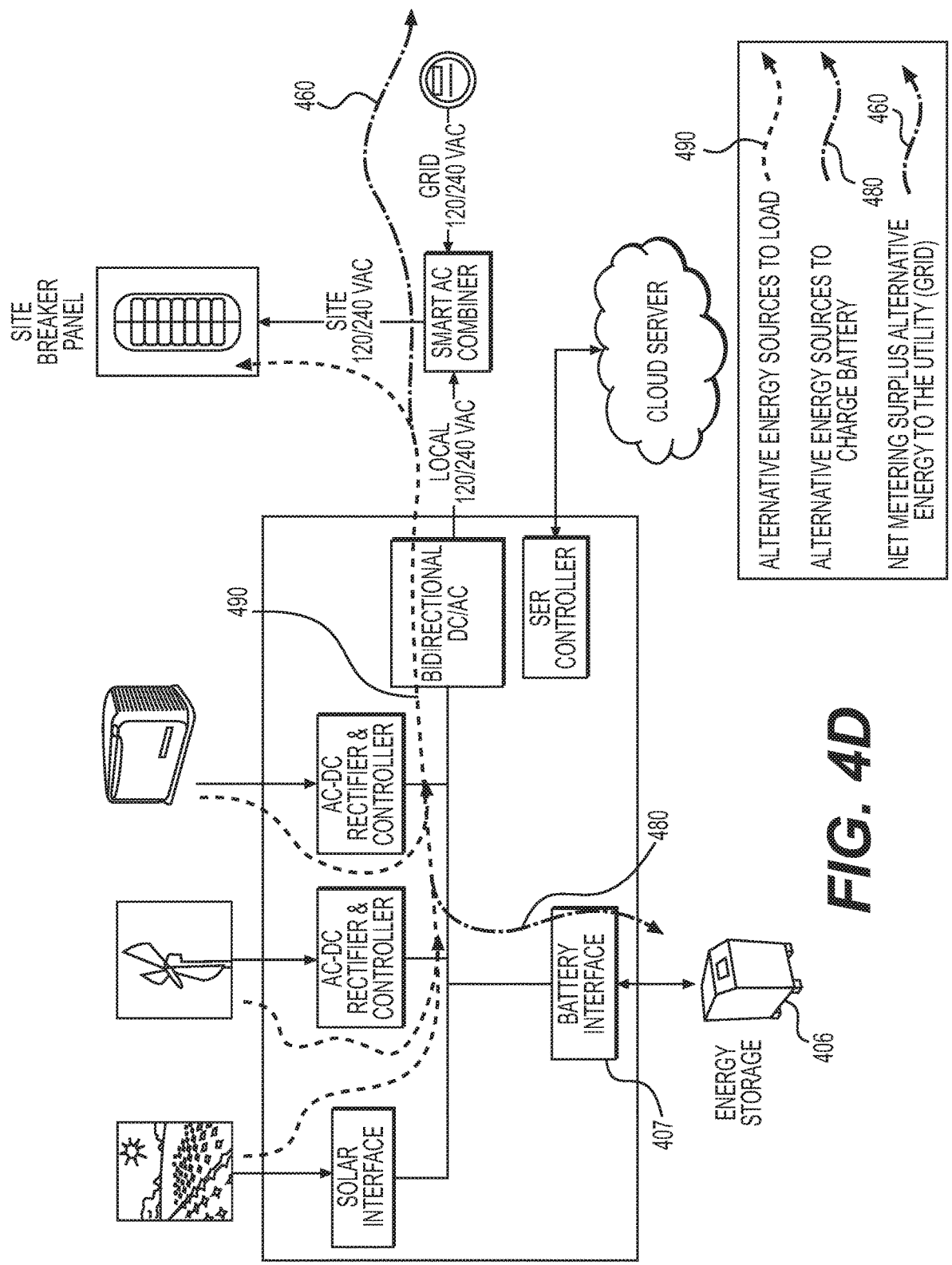

Some embodiments and algorithms may support net metering, such as shown in FIG. 4(D). In this example, the customer premise may not use all available power from the alternative energy sources 405, 412, and 414 at the inverter 410, resulting in an excess of power available from the combined alternative energy sources 405, 412, 414. The smart AC combiner 404 may be controlled, such as by SER control layer 409, to route excess power 460 to the attached grid 403, thereby selling power back to the utility provider with minimal, if any, interruption to providing energy 490 to the customer premise.

Figure 4E:
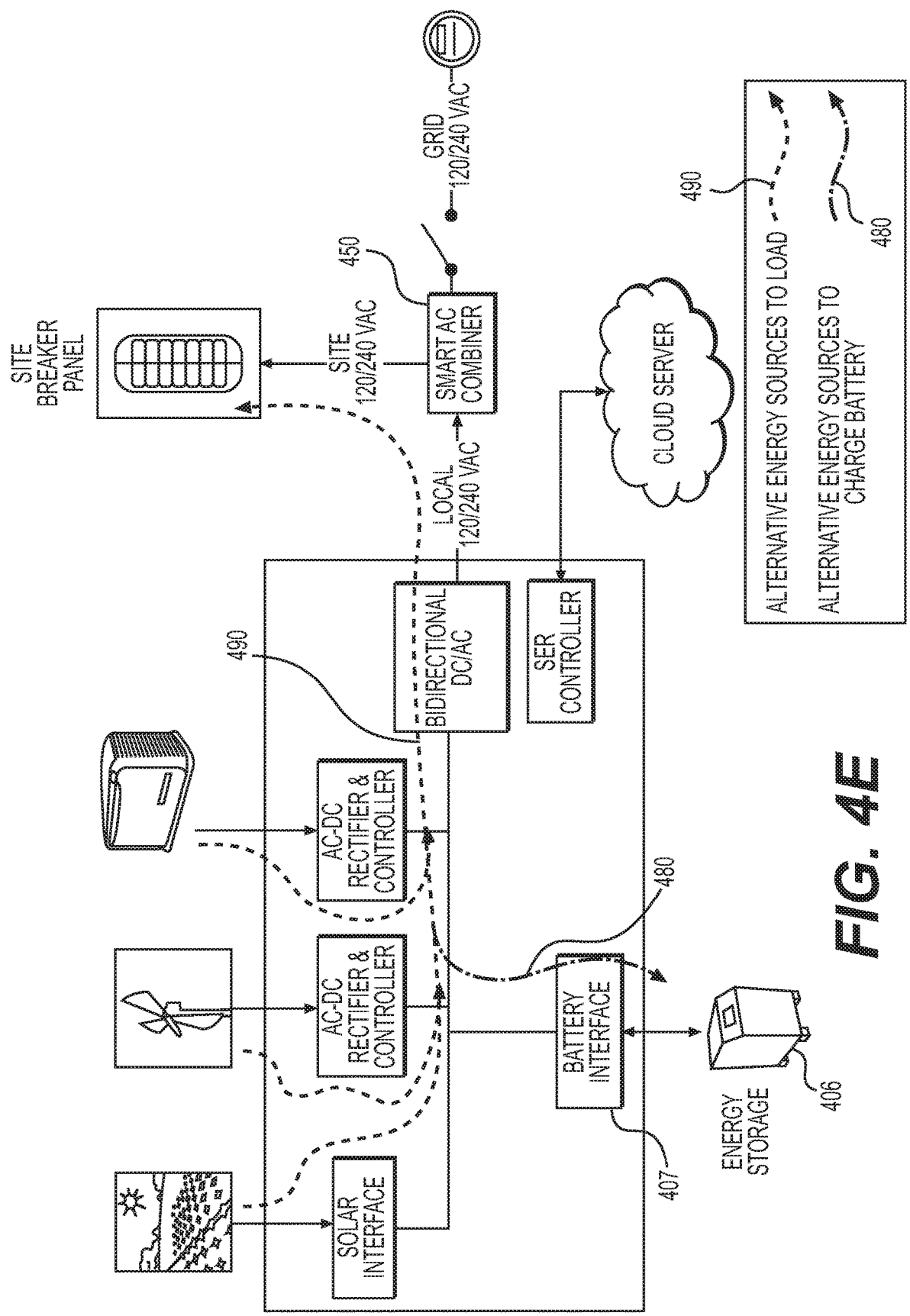

Some embodiments and algorithms may support operating an SER device in islanded mode, such as, for example, during a grid power outage, or, for instance, when grid power is insufficient to meet the customer premise's energy requirements. FIG. 4(E) shows an example of an SER device providing power in an islanded mode. In islanded mode, power routed to the customer premise (e.g., the breaker panel 402) is sourced from the inverter 410 from any available alternative energy sources 405, 412, and 414, as well as any energy storage devices 406. In this manner, power 480 from energy storage device 406 and power 490 from alternative energy sources 405, 412, and 414, may be routed to the customer premise. Isolation from the grid power 403 may be implemented from the smart AC combiner 404. The SER control layer 409 may implement such operation using one or more algorithms, such as described below.

It should be appreciated that numerous algorithms may be used to control all or portions of the features and operations of an embodiment of the SER device. The following description includes example algorithms, and is not intended to be limiting.

Figure 5:
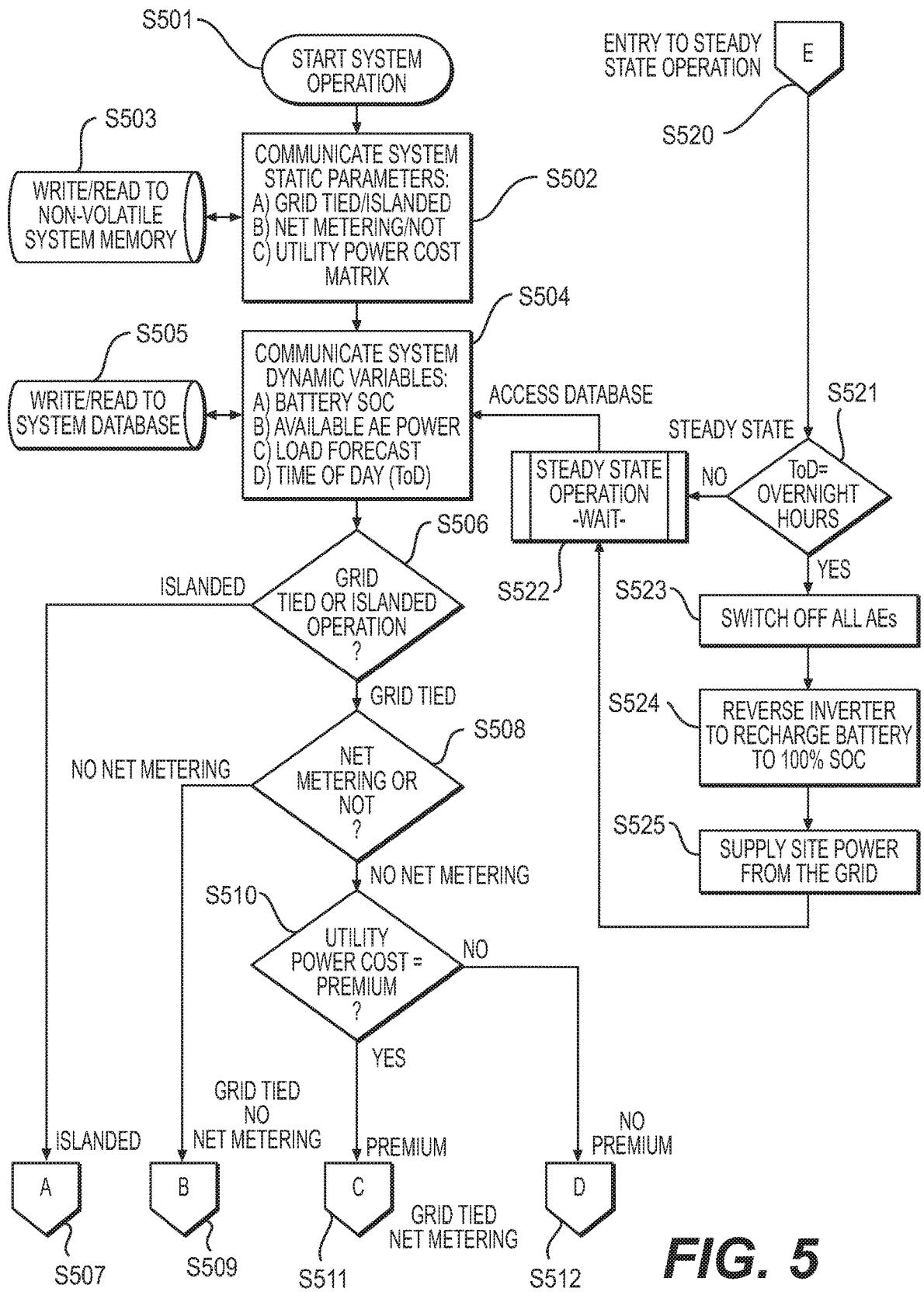
FIG. 5 is an example algorithm for system start and steady state operation, according to an embodiment of the present approach.

FIG. 5 is an example algorithm for system start and steady state operation, according to an embodiment of the present approach. The algorithm initializes S501 following a power-up or restart of the system (e.g., the SER device or the internal electrical and control layers). At steps S502 and S503, the system static parameters are retrieved from the current operational profile, which may be sourced from onboard memory, network locations, and the like. Multiple profiles can exist, and depending on the information in the profiles, one or more may be identified as forming the operational profile used for system operation. In this example, the profile is typically entered (e.g., static variables are set) when a new SER device is provisioned for initial operation. Three example parameters (of course, other parameters and sub-parameters may also exist) are 1) Grid-tied or Islanded (no grid connection) operation; 2) Net-metered or no Net-metered operation (as discussed above, net metering allows the connected utility to purchase excess power from the customer premise); and 3) The power cost matrix that contains the publicly available price levels of purchased power from the connected utility. Prices can vary based on time of day and day of the year (seasonality). Information may be stored locally in non-volatile memory of the SER controller layer, and/or may be retrieved from a networked source. System static parameters within a profile can be modified and committed to non-volatile memory under control of the SER controller layer.

In steps S504 and S505, system dynamic variables are updated and then read from a database by the SER controller layer. These steps may occur prior to entering the main flow of the system algorithm. There may be many variables maintained in an onboard database. Four example variables used in this system operation algorithm include: 1) State of Charge (SOC) of the battery (or other energy storage device), including, for example, power available from the battery as a percentage of storage capacity; 2) Available Alternative Energy (AE) Power, i.e., power currently available from alternative energy sources; 3) Forecast of the Site load requirements (power estimate) in the near future, which may include both scheduled events and a heuristic approach used to establish this variable; and 4) Date & Time of Day (ToD) maintained locally by the SER Controller, periodically updated using a network protocol (NTP) terminated at a public time server when connected to the internet.

At steps S506 and S507, the decision sets the correct operational mode based on the system static variables retrieved in S502, e.g., Islanded mode (S507) or Grid-tied mode in this example.

At steps S508 and S509, the decision point sets the correct Grid-tied operational mode based on the system static variables retrieved in S502, namely Net-metered or not Net-metered (S509).

At steps S510, S511 & S512, the decision point establishes the current cost of utility supplied power for Net-metered operation as Premium (S511) or not Premium (S512), in this example based on the power cost matrix (static variables in S502) and the ToD retrieved in S504. Premium indicates an elevated price point above typical (not premium). It should be noted that the cost of utility supplied power may be determined using other methods, and may include, for example, direct communication with a utility provider through, for instance, a communication device included within a SER device physical layer.

At step S520, the algorithm paths (S609, S708, S812 & S906) return to the steady state operation.

At step S521, the decision point establishes whether or not the system should attempt to recharge the battery during overnight hours using grid power from the attached utility by reversing the Inverter. This enables the system to enter the daylight hours (high utilization time) with a fully charged battery to better serve the load demand from the site.

At step S523, this example switches off the alternative energy sources during nighttime hours, which may be used, for example, in preparation to reverse the direction of the bi-directional inverter to power a 400 VDC bus from the attached grid.

At step S524, the system reverses the direction of the inverter to power the 400 VDC Bus and recharge the battery to 100% SOC, using a Battery Interface.

At step S525, and while the Inverter is reversed, the system controls the smart AC combiner to route grid supplied power to the customer premise.

At step S522, and in this example before entering S504 where the dynamic system variables are updated in the SER Controller and the main algorithm is re-entered, there may be a brief waiting period (e.g., about up to 30 seconds) allowing settling time following the most recent algorithm actions.

Figure 6:
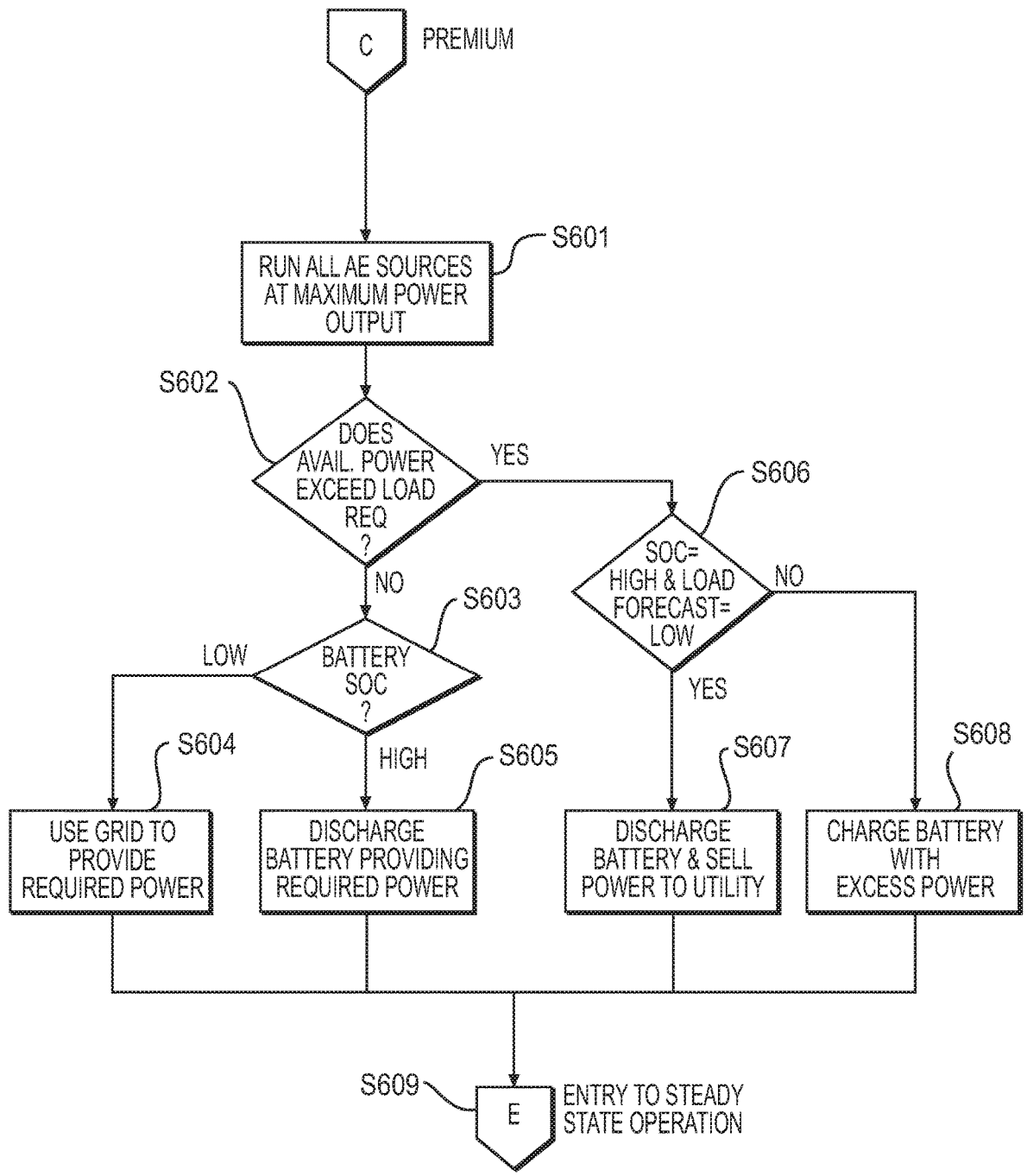
FIG. 6 is an example algorithm for operating an embodiment of the SER device during premium power cost times.

FIG. 6 is an example algorithm for operating an embodiment of the SER device during premium power cost times, also referred to as operating in Net-metered mode. It should be appreciated that this is merely an example, and that there are many ways an SER device may be operated to efficiently and/or economically route power during premium power cost times, or during periods where the cost of utility-supplied power exceeds a predetermined threshold (e.g., above an average cost over a prior period).

At step S601, the system runs available alternative energy sources at each source's maximum power output level. It should be appreciated that other embodiments may operate fewer than all alternative energy sources, and some embodiments may operate one or more alternative energy sources at less than maximum power output level, even during premium power cost times. As discussed above, various methods may be used to determine premium power cost times. Also, it should be apparent to one of ordinary skill in the art that some embodiments may maximize usage of alternative energy sources even outside of peak utility-supplied power costs, such as, for example, when alternative energy source power is abundant, energy storage devices are at or near full charge, and the cost of buying utility-supplied power exceeds the cost of selling alternative energy source power to the utility.

At step S602, the decision point determines whether the power available from alternative energy sources exceeds the current load requirements of the customer premises.

At step S603, the decision point determines how to provide the required customer premises power when the alternative energy sources do not have sufficient capacity. In this embodiment, the decision is based on the state of charge of energy storage devices. The energy storage devices and/or the grid may be used, in conjunction with alternative energy sources, to meet the customer premises energy demands. Some embodiments may monitor energy available from various sources at or near real-time, and update and/or adjust the power routing to provide the most efficient and/or economical sources of power to meet the demand. It should be appreciated that the SER device control layer may be configured to operate various algorithms to provide efficient and/or economical power routing, at or near real time, and such algorithms may be updated and/or revised.

At step S604, if the energy storage device SOC is low (e.g., below a predetermined threshold for the device, such as 25% or 5%), then grid power may be combined with alternative energy source power (S601) to meet the customer premises energy demands.

At step S605, if the energy storage device SOC is high (e.g., above a predetermined threshold for the device, such as above 50% or 75%), then power from the energy storage device may be combined with alternative energy source power (S601) to meet the customer premises energy demands. It should be appreciated that although some embodiments are described as having a single energy storage device, embodiments of the SER device may include one or more energy storage devices. Some energy storage devices may be onboard, and some energy storage devices may be connected to the central DC power stage.

At step S606, the decision point establishes the energy storage device SOC as 'high,' and a 'low' site load forecast for the purpose of potentially selling excess power to the connected utility at the current premium rate. At step S524 the energy storage device was recharged to 100% SOC, or close thereto, during overnight hours.

At step S607, the system discharges the energy storage device and sells power to the connected utility. It should be appreciated that various factors may be used to determine whether to sell power, including power from one or more energy storage devices and/or one or more alternative energy sources, to a utility. Example factors include, but are not limited to, forecasted demand over a time period, historical demand over a time period, available power from one or more sources and/or one or more storage devices, current demand, current utility-supplied power cost, current price for selling power to a utility, and the like. In step S524, the energy storage device was recharged to 100% SOC, or close thereto, during overnight hours.

At step S608, if the energy storage device SOC is 'low' or the site load forecast is 'high,' then the energy storage device may be recharged with excess power in preparation for other uses, such as, for example, the potential future increased loads and/or higher prices for selling energy to a utility provider. It should be appreciated that embodiments of the SER device may be configured to operate various algorithms for determining the most efficient and/or economical use of available power.

At step S609, the system may return to steady state operation (S520).

Figure 7:
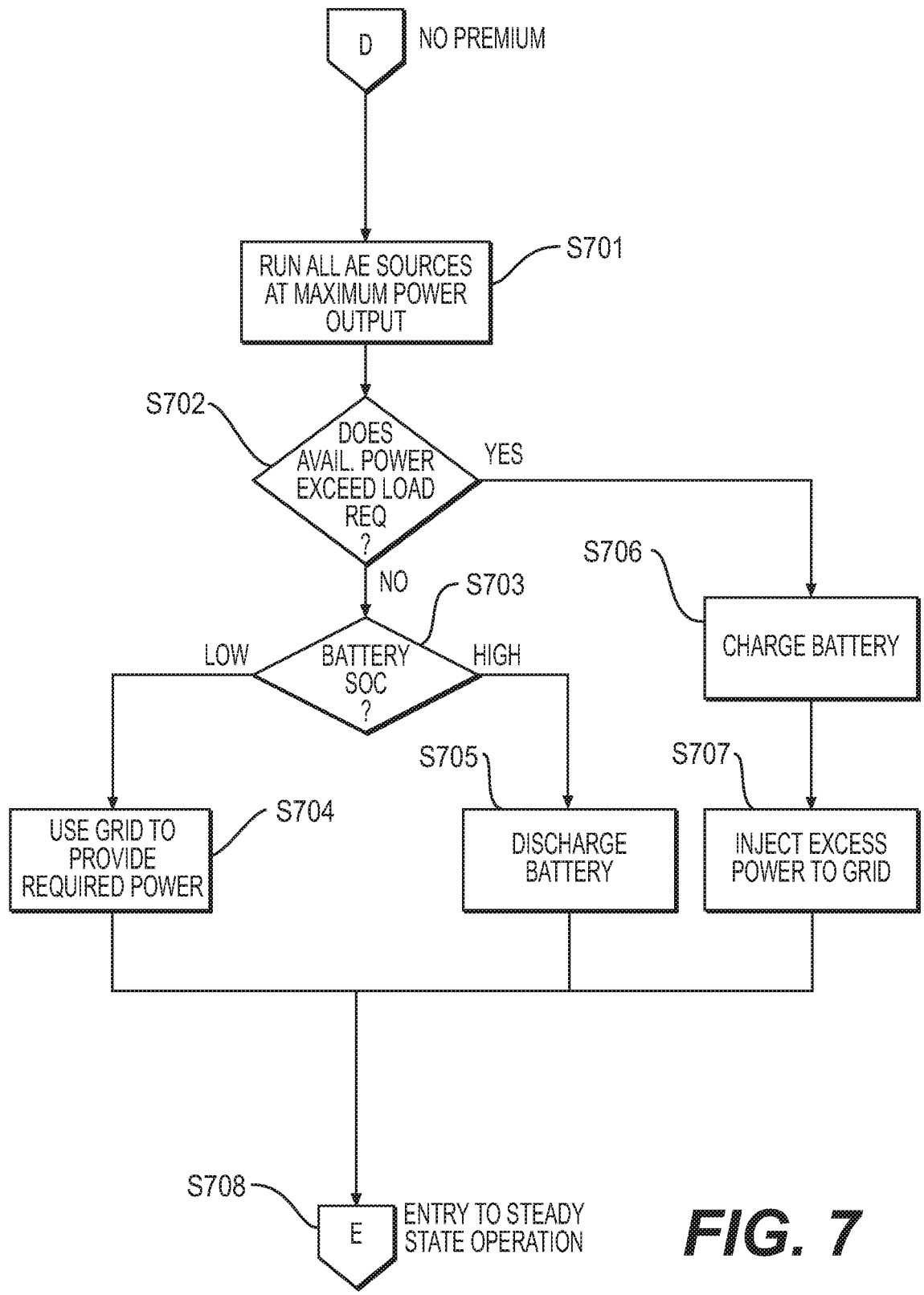
FIG. 7 is an example algorithm for operating an embodiment of the SER device outside of premium power cost times.

FIG. 7 is an example algorithm for operating an embodiment of the SER device outside of premium power cost times, also referred to as Net-metered mode outside of premium power cost times. It should be appreciated that this is merely an example, and that there are many ways an SER device may be operated to efficiently and/or economically route power outside of premium power cost times.

At step S701, the system operates alternate energy sources at or near maximum possible power output level.

At step S702, the decision point determines if the power available from all the alternate energy sources combined exceed the current load requirements of the customer premises.

At step S703, the decision point determines how to meet the customer premises power demand when alternate energy sources have insufficient capacity. In this embodiment, the decision may be based on the energy storage device SOC. Either the energy storage device and/or the grid may be combined with power from the alternate energy sources to meet the customer premises energy demands. Some embodiments may determine whether using power from energy storage devices is more efficient and economical than using utility-supplied power. The decision, which may be updated at or near real time, may be based on various factors, including, for example, forecasted demand over a time period, historical demand over a time period, available power from one or more sources and/or one or more storage devices, current demand, current utility-supplied power cost, current price for selling power to a utility, and the like. Some embodiments may also forecast power from alternative energy sources, based on, for example, weather forecasts, historical data, and the like.

At step S704, if the energy storage device SOC is low, such as below a predetermined threshold (e.g., below 35% or 5% SOC), then the control layer may combine grid power with alternative energy source power (S701) to meet the customer premises energy demands. It should be apparent to one of ordinary skill that various thresholds, including dynamic thresholds that vary based on other factors, may be implemented in other embodiments.

At step S705, if the energy storage device SOC is high, such as above a predetermined threshold (e.g., above 75%), the control layer may discharge the energy storage device and combined power with alternate energy sources (S701) to meet the customer premises energy demands.

At step S706, when the power available from alternate energy sources exceeds the current load requirements of the customer premises, the energy storage device is recharged with this excess energy.

At step S707, after energy storage device reaches 100% SOC or thereabout (or another predetermined threshold, such as described above), the control layer may route excess energy to the grid for sale to the utility provider.

At step S708, the system returns to steady state operation (S520).

Figure 8:
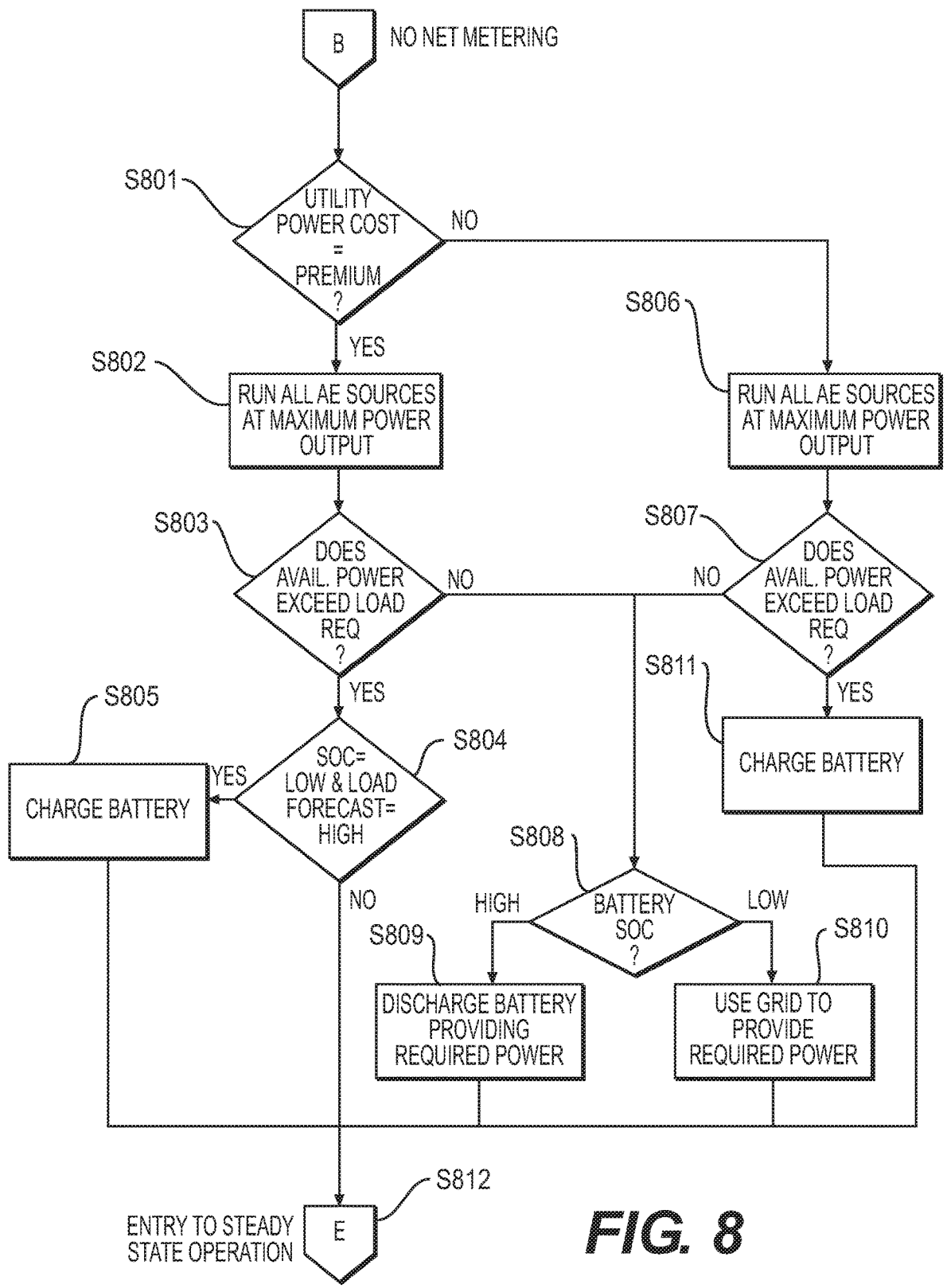
FIG. 8 is an example algorithm for operating an embodiment of the SER device without net metering.

FIG. 8 is an example algorithm for operating an embodiment of the SER device in grid-tied mode, without net metering.

At step S801, the decision point establishes the current cost of utility-supplied power without net metering as Premium (S802) or not Premium (S806), based on the power cost matrix (static variables in S502) and the ToD retrieved in S504. Premium indicates an elevated price point above a typical or non-premium price. It should be appreciated that other classifications may be used regarding the price of utility-supplied power, and other factors and variables may be used to determine the state of utility-supplied power.

At step S802, the control layer operates alternative energy sources at their maximum power output level. Other embodiments may operate one or more alternative energy sources at different output levels for various reasons, such as, for example, to extend the useful life of a device, take advantage of weather conditions, and the like.

At step S803, the decision point determines whether the power available from alternative energy sources is adequate to meet or exceed the current load requirements of the customer premises.

At step S804. The decision point establishes whether the energy storage device SOC is 'low,' such as below a predetermined threshold (e.g., below 35% or 5% SOC), and a 'high' customer premises load forecast (e.g., relative to an average load, or relative to a threshold that may be static or dynamic as described herein), to prepare energy storage device(s) for the potential and/or forecasted increase in the customer premises load.

At step S805, when the energy storage device SOC is 'low' and the customer premises load forecast is 'high,' the energy storage device may be recharged with excess power in preparation for the potential and/or forecasted increase in the customer premises load.

At step S806, the control layer operates alternative energy sources at their maximum possible power output level.

At step S807, the decision point determines whether the power available from alternative energy sources meets and/or exceeds the load requirements of the customer premises.

At step S808, the decision point determines how to meet the customer premises power demand when alternative energy sources lack capacity. In this embodiment, the decision may be based on the energy storage device SOC. The energy storage device and/or the grid may be combined with alternative energy sources to meet the customer premises energy demands, as described above.

At step S809, if the energy storage device SOC is 'high,' such as with respect to a predetermined threshold (e.g., above 50% or 75%), the energy storage device may be discharged and power combined with alternative energy sources (S802 & S806) to meet the customer premises energy demands. As described above, the thresholds described herein may be static or dynamic, and may be set at or near real-time based on one or more factors and variables.

At step S810, if the energy storage device SOC is 'low,' such as with respect to a predetermined threshold (e.g., below 50% or 15%), the grid power may be combined with alternative energy sources (S802 & S806) to meet the customer premises energy demands.

At step S811, when power available from all alternative energy sources exceeds the load requirements of the customer premises, the energy storage device may recharged with excess power. Once the energy storage device reaches 100% SOC (or other predetermined threshold), the alternative energy sources may be scaled back to meet the customer premises energy demand. In other embodiments, excess capacity may be sold to the utility provider as described above.

At step S812, the system returns to steady state operation (S520).

Figure 9:
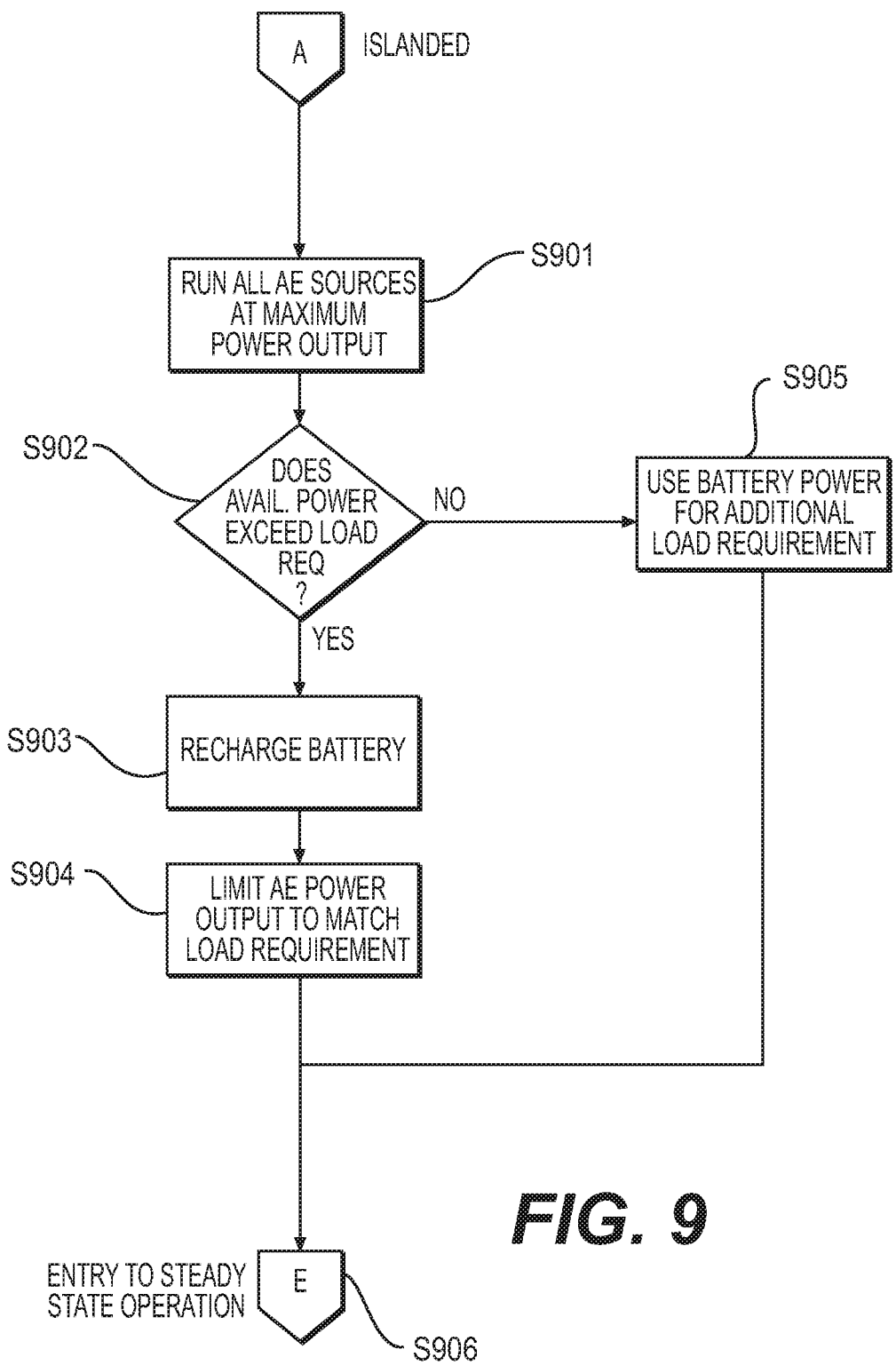
FIG. 9 is an example algorithm for islanded operating an embodiment of the SER device.

Embodiments of the SER device may be operated in an islanded mode, in which power from the grid is unavailable (e.g., power outages, storm damage). FIG. 9 is an example algorithm for islanded operating an embodiment of the SER device. Of course, other algorithms may be used.

After determining that an SER device should operate in islanded mode, at step S901, the control layer operates alternative energy sources at or near maximum power output level.

At step S902, the decision point determines whether the power available from alternative energy sources exceeds the load requirements of the customer premises.

In steps S903 & S904, when the power available from alternative energy sources exceeds the load requirements of the customer premises, the energy storage device may be recharged with excess energy. Once the energy storage device reaches 100% SOC (or other threshold), the alternative energy sources may be scaled back to match customer premises energy demand. In some embodiments, the control layer may query whether the utility provider is capable of receiving power (e.g., grid is operating), and then exit the islanded mode and route excess power to the utility provider for sale as described above.

At step S905, when the power available from all alternative energy sources does not exceed the load requirements of the customer premises, the energy storage device may be used to meet the customer premises energy demands. If the available power sources are inadequate to meet the demand, then the control layer may communicate with an HEMS to negotiate a reduction in load.

At step S906, the system may return to steady state operation (S520).

In some embodiments, the SER device may be configured to implement voltage regulation when operating in islanded mode. For example, according to one embodiment, voltage may be set for any total load at a particular point in time to improve overall energy efficiency. This minimized power consumption may be based on, for example, the optimum efficiency of the combined load in the customer premises. The desirable voltage regulation method may also be determined through historical data, including various power, time, behavior, and HEMS parameters in order to use a heuristic algorithm within the SER.

Figure 10:
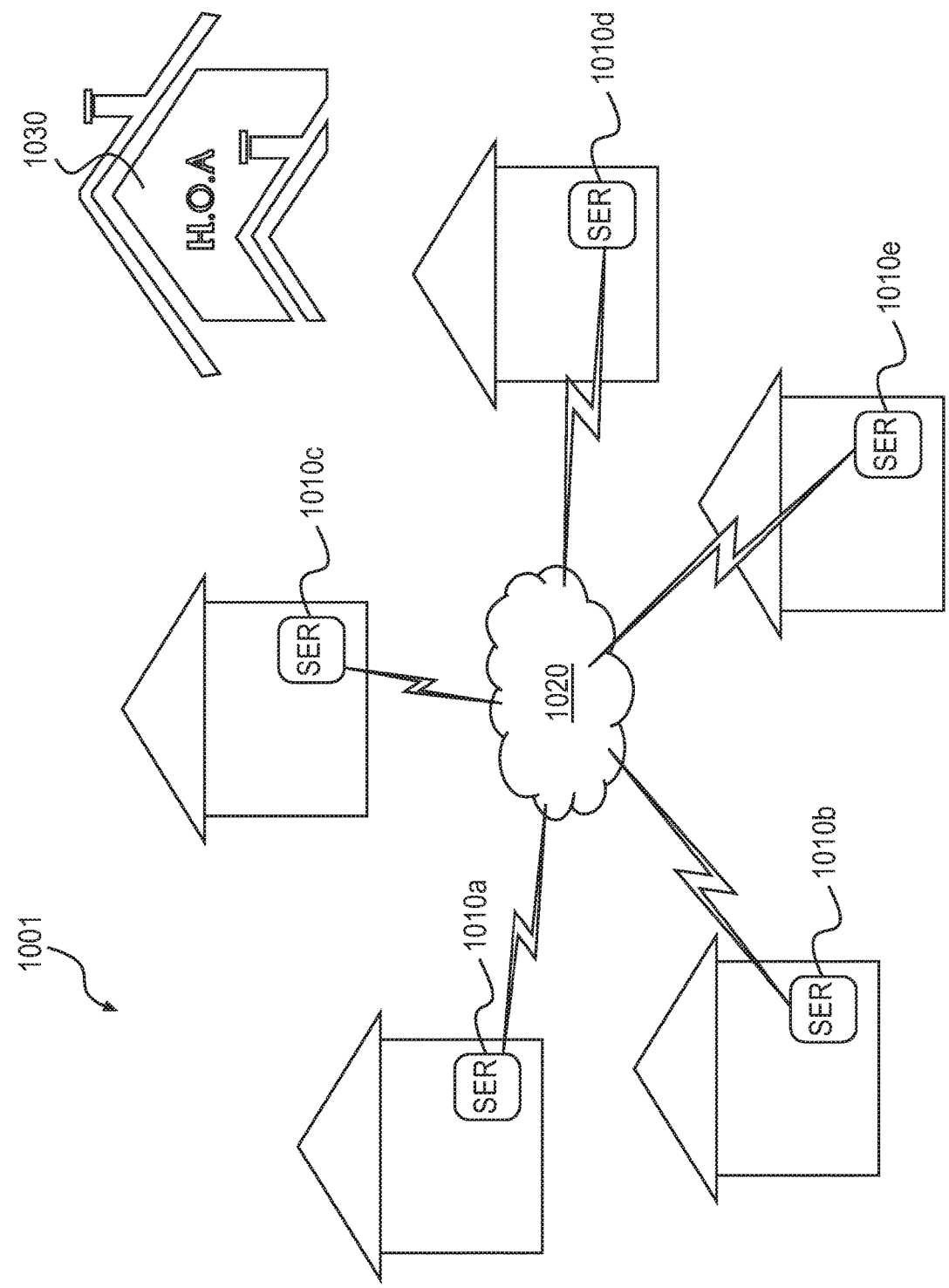
FIG. 10 illustrates an exemplary embodiment of the present disclosure with a plurality of residential units with SER devices installed.

Some embodiments of the SER device may be configured for operating within a community of SER devices. One or more SER devices may communicate with each other to form a networked community, for exchanging information (e.g., status, grid pricing, available energy resources, current demands, etc.), and for routing energy between networked SER devices for the benefit of the community. As a result, the community may achieve improved energy usage and efficiency. SER device communities may be formed in, for example, multi-tenant dwellings and units in a common group, such as cabins on a shared property, residences in a neighborhood, and the like. The SER devices within a community may interconnect DC bus resources through an external connection, as described herein, and the SER controllers in the community may operate collaboratively to control power sharing among the SER devices within the community. For example, FIG. 10 shows a community 1001 in which a plurality of residential units with SER devise 1010a-1010e communicate through communications medium 1020. The SER community 1001 may be governed by, for example, a homeowners association 1030, or other entity organizing SER devices for efficient energy routing and usage. One or more SER devices 1010a-1010e may be connected to a grid (not shown), and one or more SER devices 1010a-1010e may be configured for routing power to other SER devices within the community 1001. For example, if SER device 1010a has a very high battery SOC (e.g., over 95%), and SER device 1010b is experiencing a heavy site demand, then SER community 1001 may allow power sharing from SER device 1010a to SER device 1010b, and thereby provide improved energy efficiency for the overall community.

It should be appreciated that one or more features of the SER device described herein may be combined as part of an overall energy management function. In this function, voltage regulation, energy flows to and from energy storage devices, and energy flow from sources such as photovoltaic cells and external generators (as examples) may be optimized. Potential data sources may include information from the HEMS, internally collected power parameters, commodity and rate pricing, utility-supplied information, time of day and utility rate detail. These may be used to minimize general cost of energy, avoid time of use, reduce peak use charges, and/or optimize availability in an outage condition.

As will be appreciated by one of skill in the art, aspects or portions of the present approach may be embodied as a method, system, and at least in part, on a computer readable medium. Accordingly, the present approach may take the form of combination of hardware and software embodiments (including firmware, resident software, micro-code, etc.) or an embodiment combining software and hardware aspects that may all generally be referred to herein as a "circuit," "module" or "system." For example, measurements and subsequent calculations can be automated, using one or more software modules to characterize the device, record resistance changes, calculate deflections, calculate device temperature, and/or calculate rate of heat accumulation or exchange. Furthermore, the present approach may take the form of a computer program product on a computer readable medium having computer-usable program code embodied in the medium. The present approach might also take the form of a combination of such a computer program product with one or more devices, such as a modular sensor, systems relating to communications, control, an integrate remote control component, etc.

Any suitable non-transitory computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the non-transitory computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a device accessed via a network, such as the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any non-transitory medium that can contain, store, communicate, propagate, or transport the program for use by or in connection with the instruction execution system, apparatus, or device.

Computer program code for carrying out operations of the present approach may be written in an object oriented programming language such as Java, C++, etc. However, the computer program code for carrying out operations of the present approach may also be written in conventional procedural programming languages, such as the "C" programming language or similar programming languages. The program code may execute entirely on the SER device, a user's computer, partly on the user's computer, as a stand-alone software package, partly on the user's computer and partly on a remote computer or entirely on the remote computer or server, as examples. In the latter scenario, the remote computer may be connected to the user's computer through a local area network (LAN) or a wide area network (WAN), or the connection may be made to an external computer (for example, through the Internet using an Internet Service Provider).

The present approach is described with reference to illustrations and/or diagrams of methods, apparatus (systems) and computer program outputs according to embodiments of the approach. It will be understood that the steps described above, and the outputs, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable memory, including a networked or cloud accessible memory, that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to specially configure it to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present approach may be presented and responded to via a graphical user interface (GUI) presented on the display of the mobile communications device or the like. Prompts may also be audible, vibrating, etc.

One of ordinary skill should understand that the above description and the Figures illustrate the architecture, functionality, and operation of possible implementations of devices, systems, methods, and computer program products according to various embodiments of the present approach. In this regard, each step in the disclosed embodiments and each calculation and output may represent a block, module, segment, or portion of code, which comprises one or more executable instructions for implementing the specified logical function(s). It should also be noted that, in some alternative implementations, the functions in a block may occur out of the order noted in the figures. For example, two blocks in succession may, in fact, be executed substantially concurrently, or the blocks may sometimes be executed in the reverse order, depending upon the functionality involved. It will also be noted that each block, and combinations of blocks in, can be implemented by special purpose hardware-based systems which perform the specified functions or acts, or combinations of special purpose hardware and computer instructions.

The terminology used herein is for the purpose of describing particular embodiments only and is not intended to be limiting of the approach. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the foregoing description references certain preferred embodiments, other embodiments are possible. Additionally, the foregoing illustrative embodiments, examples, features, advantages, and attendant advantages are not meant to be limiting, as the devices, systems, and methods disclosed herein may be practiced according to various alternative embodiments, as well as without necessarily providing, for example, one or more of the features, advantages, and attendant advantages that may be provided by the foregoing illustrative embodiments.

Accordingly, while devices, systems, and methods have been described and illustrated in connection with preferred embodiments, many variations and modifications as will be evident to those skilled in the art may be made without departing from the scope of the present approach, and the claims should not be limited to the precise details of meth-

What is claimed is:

1. An electrical distribution site energy management device comprising:
   (A) a smart AC combiner having:
      (i) an electrical connection terminal in electrical communication with an electrical grid power supply,
      (ii) an electrical connection terminal in electrical communication with a consumer electrical supply line, and
      (iii) an electrical connection terminal in electrical communication with a central DC power stage;
   (B) the central DC power stage having:
      (i) at least one bi-directional electrical connection terminal configured for electrical communication with a power storage device, the at least one bi-directional electrical connection terminal in electrical communication with the central DC power stage and capable of a first configuration for supplying DC power to the central DC power stage, and a second configuration for supplying DC power to the power storage device;
      (ii) at least one alternative energy source electrical connection terminal configured for electrical communication with an alternative energy source, the at least one alternative energy source electrical connection terminal in electrical communication with the central DC power stage and configured to supply DC power to the central DC power stage;
   (C) a bi-directional DC/AC inverter in electrical communication with the central DC power stage and the smart AC combiner, the bi-directional DC/AC inverter capable of a first configuration for supplying AC power to the smart AC combiner, and a second configuration for supplying DC power to the central DC power stage; and
   (D) a controller layer configured to control at least the bi-directional DC/AC inverter, the control layer comprising at least one computer processor and nonvolatile memory coupled to the computer processor, wherein the controller layer manages one or more of (i) a supply of voltage and frequency regulation services to the electric grid, and (ii) a real power transfer and a reactive power transfer through the device, and further wherein the controller layer manages power flows from one or more of the power storage device and the alternative energy source to the energy management device based on one or more onsite performance parameters to optimize operation at the site, wherein the one or more onsite performance parameters include parameters other than grid power price;
   wherein the device further comprises a modular power processing architecture capable of electrically coupling to a second site energy management device for increasing one or more of power levels and voltages available at a site.

2. The electrical distribution site energy management device of claim 1, further comprising a plurality of bi-directional electrical connection terminals, each terminal configured for electrical communication with a power storage device, and in electrical communication with the central DC power stage, and capable of a first configuration for supplying DC power to the central DC power stage and a second configuration for supplying DC power to the power storage device.

3. The electrical distribution site energy management device of claim 2, wherein the controller layer is configured for selectively controlling the configuration of each of the plurality of bi-directional electrical connection terminals.

4. The electrical distribution site energy management device of claim 1, further comprising a plurality of alternative energy source electrical connection terminals, each alternative energy source electrical connection terminal configured for electrical communication with an alternative energy source, in electrical communication with the central DC power stage, and configured to supply DC power to the central DC power stage.

5. The electrical distribution site energy management device of claim 4, wherein the controller layer is configured for selectively controlling each of the plurality of alternative energy source electrical connection terminals.

6. The electrical distribution site energy management device of claim 1, wherein the central DC power stage is configured for receiving at least one modular bi-directional electrical connection terminal configured for electrical communication with a power storage device, the modular bi-directional electrical connection terminal configured for attachment to the site energy management device, in electrical communication with the central DC power stage when attached, and capable of a first configuration for supplying DC power to the central DC power stage, and a second configuration for supplying DC power to the power storage device.

7. The electrical distribution site energy management device of claim 1, wherein the central DC power stage is configured for receiving at least one modular alternative energy source electrical connection terminal configured for electrical communication with an alternative energy source, the modular electrical connection terminal configured for attachment to the site energy management device, in electrical communication with the central DC power stage when attached, and configured to supply DC power to the central DC power stage.

8. The electrical distribution site energy management device of claim 1, wherein the controller layer is configured to selectively operate the site energy management device in an islanded mode such that the smart AC combiner provides power to the consumer electrical supply line from the at least one bi-directional electrical connection terminal and the at least one alternative energy source electrical connection terminal.

9. The electrical distribution site energy management device of claim 1, wherein the controller layer is configured to selectively operate the site energy management device in a net metering mode such that the smart AC combiner provides power to the grid power supply from the bi-directional DC/AC inverter.

10. The electrical distribution site energy management device of claim 1, wherein the controller layer is configured to selectively provide power to a power storage device from an alternative energy source.

11. The electrical distribution site energy management device of claim 1, wherein the controller layer is configured to operate the site energy management device such that the smart AC combiner provides power to the consumer electrical supply line from the grid power supply, the at least one bi-directional electrical connection terminal, and the at least one alternative energy source electrical connection terminal.

12. The electrical distribution site energy management device of claim 1, further comprising a home energy management system.

13. The electrical distribution site energy management device of claim 1, wherein the controller layer is configured to communicate with a home energy management system.

14. The electrical distribution site energy management device of claim 1, wherein the alternative energy source is selected from the group comprising a photovoltaic cell, a wind generator, and a fossil fuel generator.

15. The electrical distribution site energy management device of claim 1, wherein the energy storage device comprises a battery.

16. The electrical distribution site energy management device of claim 1, further comprising a plurality of plug-in card slots, each plug-in card slot in electrical communication with the central DC power stage.

17. The electrical distribution site energy management device of claim 1, further comprising a physical layer having at least one communication device in operable communication with the controller layer, the communication device for receiving data relating to the price of electricity supplied through a grid power supply.

18. An electrical distribution site energy management device comprising:
(A) a smart AC combiner having:
 (i) an electrical connection terminal in electrical communication with an electrical grid power supply,
 (ii) an electrical connection terminal in electrical communication with a consumer electrical supply line, and
 (iii) an electrical connection terminal in electrical communication with a central DC power stage;
(B) the central DC power stage having:
 (i) a plurality of one bi-directional electrical connection terminals, each bi-directional electrical connection terminal configured for electrical communication with a power storage device, in electrical communication with the central DC power stage, and capable of a first configuration for supplying DC power to the central DC power stage, and a second configuration for supplying DC power to the power storage device;
 (ii) at least one alternative energy source electrical connection terminal configured for electrical communication with an alternative energy source, the at least one alternative energy source electrical connection terminal in electrical communication with the central DC power stage and configured to supply DC power to the central DC power stage; and
(C) a bi-directional DC/AC inverter in electrical communication with the central DC power stage and the smart AC combiner, the bi-directional DC/AC inverter capable of a first configuration for supplying AC power to the smart AC combiner, and a second configuration for supplying DC power to the central DC power stage;
(D) a controller layer configured to control at least the bi-directional DC/AC inverter, wherein the controller layer manages one or more of (i) a supply of voltage and frequency regulation services to the electric grid, and (ii) a real power transfer and a reactive power transfer through the device, the control layer comprising at least one computer processor and nonvolatile memory coupled to the computer processor, and further wherein the controller layer manages power flows from one or more of the power storage device and the alternative energy source to the energy management device based on one or more onsite performance parameters to optimize operation at the site, wherein the one or more onsite performance parameters include parameters other than grid power price;
wherein the device further comprises a modular power processing architecture capable of electrically coupling to a second site energy management device for increasing one or more of power levels and voltages available at a site.

19. The electrical distribution site energy management device of claim 18, wherein the smart AC combiner is configured for electrical connection to a plurality of consumer electrical supply lines.

20. The electrical distribution site energy management device of claim 19, wherein the controller layer is configured to measure the power available at one or more of at least one bi-directional electrical connection terminal, the at least one alternative energy source electrical connection terminal, and the grid power supply.

* * * * *